(12) United States Patent
Shao

(10) Patent No.: US 12,069,640 B2
(45) Date of Patent: Aug. 20, 2024

(54) CORRESPONDENCE BETWEEN TRANSPORT BLOCK AND CODEWORD, RELATED DEVICE, AND SYSTEM

(71) Applicant: Huawei Technologies Co., Ltd., Shenzhen (CN)

(72) Inventor: Jiafeng Shao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 636 days.

(21) Appl. No.: 17/214,149

(22) Filed: Mar. 26, 2021

(65) Prior Publication Data

US 2021/0227560 A1  Jul. 22, 2021

Related U.S. Application Data

(63) Continuation of application No. PCT/CN2019/107478, filed on Sep. 24, 2019.

(30) Foreign Application Priority Data

Sep. 27, 2018 (CN) .......................... 201811134449.1

(51) Int. Cl.
*H04W 72/00* (2023.01)
*H04L 1/00* (2006.01)
(Continued)

(52) U.S. Cl.
CPC ....... *H04W 72/1263* (2013.01); *H04L 1/0004* (2013.01); *H04W 72/0446* (2013.01);
(Continued)

(58) Field of Classification Search
None
See application file for complete search history.

(56) References Cited

U.S. PATENT DOCUMENTS 11,115,965 B2    9/2021  Shin et al.
2010/0056079 A1*  3/2010  Onggosanusi ........ H04L 1/1887
                                                        455/95

(Continued)

FOREIGN PATENT DOCUMENTS

CN    101699780 A    4/2010
CN    101741517 A    6/2010
(Continued)

OTHER PUBLICATIONS

AT&T, "Remaining Issues for MIMO Codeword Mapping", 3GPP TSG RAN WG1 Meeting #92bis, R1-1804654, Apr. 16-20, 2018, 8 pages, Sanya, China.

(Continued)

*Primary Examiner* — Gerald A Smarth
(74) *Attorney, Agent, or Firm* — Slater Matsil, LLP

(57) ABSTRACT

This application provides a method for determining a correspondence between a transport block and a codeword, a related device, and a system. The method includes: A terminal device receives first downlink control information (DCI), where the first DCI is used to indicate the terminal device to receive a first transport block on a first time-frequency resource; and the terminal device determines, based on first information, that the first transport block is mapped to a first codeword, where the first information includes at least one of the following: first search space in which the first DCI is located, a first DCI format corresponding to the first DCI, a first radio network identifier (RNTI) used for scrambling the first DCI, or a first bit field included in the first DCI.

20 Claims, 7 Drawing Sheets

(51) Int. Cl.

| | |
|---|---|
| *H04W 72/044* | (2023.01) |
| *H04W 72/0446* | (2023.01) |
| *H04W 72/0453* | (2023.01) |
| *H04W 72/1263* | (2023.01) |
| *H04W 72/23* | (2023.01) |
| *H04W 72/50* | (2023.01) |
| *H04W 76/27* | (2018.01) |

(52) U.S. Cl.
CPC ... *H04W 72/0453* (2013.01); *H04W 72/0466* (2013.01); *H04W 72/23* (2023.01); *H04W 72/535* (2023.01); *H04W 76/27* (2018.02)

(56) References Cited

U.S. PATENT DOCUMENTS

| | | | |
|---|---|---|---|
| 2011/0299484 A1* | 12/2011 | Nam | H04L 1/1896 370/329 |
| 2013/0028213 A1* | 1/2013 | Ko | H04L 1/1607 370/329 |
| 2013/0301554 A1 | 11/2013 | Nam et al. | |
| 2018/0070265 A1 | 3/2018 | Seo et al. | |
| 2018/0294857 A1* | 10/2018 | Rahman | H04L 1/0075 |

FOREIGN PATENT DOCUMENTS

| | | | | |
|---|---|---|---|---|
| CN | 102083223 A | | 6/2011 | |
| CN | 107735977 A | | 2/2018 | |
| CN | 107888236 A | | 4/2018 | |
| CN | 104919724 B | * | 5/2018 | H04L 5/0035 |
| EP | 2555459 A2 | | 2/2013 | |
| WO | 2009015315 A1 | | 1/2009 | |
| WO | WO-2011122829 A2 | * | 10/2011 | H04B 7/0413 |
| WO | WO-2013000509 A1 | * | 1/2013 | H04B 7/0456 |
| WO | 2017188548 A1 | | 11/2017 | |
| WO | 2018149273 A1 | | 8/2018 | |

OTHER PUBLICATIONS

Ericsson, "Remaining issues on CW mapping and data scrambling", 3GPP TSG RAN WG1 Meeting #93 R1-1806210, May 21-25, 2018, 5 pages, Busan, Korea.

AT and T, "A Scalable Transport Block to Codeword Mapping Scheme for NR", 3GPP TSG RAN WGI Meeting #88 R1-1702263, Feb. 17, 2017, 8 pages.

3GPP TS 38.214 V15.2.0, 3rd Generation Partnership Project, Technical Specification Group Radio Access Network, NR, Physical layer procedures for data (Release 15), Jun. 2018, 95 pages.

Samsung, "Summary of issues on codeword mapping", 3GPP TSG RAN WG1 Meeting #92bis, R1-1804354, Mar. 16-20, 2018, 3 pages, Sanya, China.

Ericsson et al., "DL multi-TRP and multi-panel transmission", 3GPP TSG-RAN WG1 #89ah-NR, R1-1711013, Jun. 27-30, 2017, 4 pages, Qingdao, China.

Xiaowen, L. et al; "Implementation of DCI Format Detection and Transmission Scheme Confirmation of PDSCH in LTE System", School of Communication and Information Engineering, Chongqing University of Posts and Telecommunications, 2013, 6 pages, Chongqing, China.

Abbas, S. et al., "Design and Performance Tradeoff Analysis of Floating Point Datapath in LTE Downlink Control Channel Receiver", International Conference on Recent Trends in Information Technology, 2014, 6 pages.

* cited by examiner

CORRESPONDENCE BETWEEN TRANSPORT BLOCK AND CODEWORD, RELATED DEVICE, AND SYSTEM

CROSS-REFERENCE TO RELATED APPLICATIONS

This application is a continuation of International Application No. PCT/CN2019/107478, filed on Sep. 24, 2019, which claims priority to Chinese Patent Application No. 201811134449.1, filed on Sep. 27, 2018. The disclosures of the aforementioned applications are hereby incorporated by reference in their entireties.

TECHNICAL FIELD

This application relates to the communications field, and in particular, to a correspondence between a transport block and a codeword, a related device, and a system.

BACKGROUND

Mobile communications technologies have profoundly changed people's lives, but people's pursuit of a higher-performance mobile communications technology has never stopped. To cope with future explosive growth of mobile data traffic, massive mobile communications device connections, and various emerging new services and application scenarios, a fifth generation (5G) mobile communications system emerges. The international telecommunication union (ITU) defines three types of application scenarios for 5G and a future mobile communications system: enhanced mobile broadband (eMBB), ultra-reliable and low latency communications (URLLC), and massive machine type communications (mMTC).

Typical URLLC services include wireless control in an industrial manufacturing or production process, motion control and remote repair of unmanned vehicles and unmanned aircrafts, a tactile interaction application such as remote surgery, and the like. These services are mainly characterized by ultra-high reliability, low latency, a relatively small data transmission amount, and bursting. Typical mMTC services include automatic intelligent power distribution, a smart city, and the like, and are mainly characterized by a large quantity of networking devices, a relatively small data transmission amount, and insensitivity of data to transmission latency. For such mMTC, a terminal needs to meet requirements of low costs and very long standby time. Typical eMBB services include an ultra-high-definition video, augmented reality (AR), virtual reality (VR), and the like. These services are mainly characterized by a large data transmission amount and a very high transmission rate.

In a new radio access network (New RAN, NR), for downlink transmission, the following procedure is generally performed: A network device sends downlink control information (DCI) to a terminal device, where the DCI indicates that the DCI carries indication information indicating a length, a frequency domain resource, a modulation scheme, and the like that are of a time domain resource occupied by a physical downlink shared channel (PDSCH). After receiving the downlink control information, the terminal device receives a transport block on a corresponding time-frequency resource according to an indication of the DCI, and maps the transport block to a codeword (CW). Then, the terminal device decodes the CW and obtains a decoding result, and feeds back the decoding result to the network device by using a physical uplink control channel (PUCCH) or a physical uplink shared channel (PUSCH) indicated by the DCI, so that after learning that the terminal device has a receiving error, the network device can quickly retransmit data to ensure data transmission reliability. If the terminal device successfully decodes the CW, the decoding result is an acknowledgement (ACK). If the terminal device fails to decode the CW, the decoding result is a negative acknowledgement (NACK).

However, a person skilled in the art finds, through long-term study, that how to properly determine a correspondence between a transport block and a codeword is a problem to be resolved.

SUMMARY

Embodiments of this application provide a correspondence between a transport block and a codeword, a related device, and a system, so that a mapping relationship between a transport block and a codeword can be properly determined.

According to a first aspect, a method for determining a correspondence between a transport block and a codeword is provided, and includes: A terminal device receives first downlink control information DCI, where the first DCI is used to indicate the terminal device to receive a first transport block on a first time-frequency resource; and determines, based on first information, that the first transport block is mapped to a first codeword, where the first information includes at least one of the following: a first search space set in which the first DCI is located, a first DCI format corresponding to the first DCI, a first radio network identifier RNTI used for scrambling the first DCI, or a first bit field included in the first DCI. In the foregoing solution, the terminal device may determine, based on the first information, that the first transport block is mapped to the first codeword, so that a mapping relationship between a transport block and a codeword is properly determined, and a decoding result of the transport block is correctly fed back. It may be understood that when a solution in the conventional technology is used, if the terminal device receives one of a plurality of transport blocks, the terminal device maps, by default, the received transport block to a codeword 0 for decoding, and feeds back a decoding result of the transport block as decoding results of the plurality of transport blocks, and consequently, decoding results of different transport blocks cannot be correctly fed back. When a technical solution in this application is used, even if the terminal device receives only one of a plurality of transport blocks, the terminal device determines, based on the first information, that the first transport block is mapped to the first codeword for decoding, and feeds back the decoding result of the first transport block only as the decoding result of the first transport block, so that a decoding result of the transport block can be correctly fed back.

In a possible design, the terminal device may determine, in at least two manners, that a second transport block is mapped to a second codeword: In a first manner, the terminal device determines that there is the second transport block, and determines, based on the first information, that the second transport block is mapped to the second codeword, where the second codeword is different from the first codeword. In a second manner, the terminal device receives second DCI, where the second DCI is used to indicate the terminal device to receive the second transport block on a second time-frequency resource; and determines, based on second information, that the second transport block is mapped to the second codeword, where the second information includes at least one of the following: a second search space set in which the second DCI is located, a second DCI format corresponding to the second DCI, a second RNTI used for scrambling the second DCI, a second bit field included in the second DCI, or the first codeword. In the foregoing solution, the terminal device may determine, based on the first information, that the first transport block is mapped to the first codeword, and that the second transport block is mapped to the second codeword. In other words, different transport blocks scheduled by different DCI are mapped to different codewords, so that the terminal device can determine, based on the first information, the codeword corresponding to the second transport block even if the terminal device does not receive DCI indicating the second transport block. The terminal device may separately feed back HARQ information corresponding to the first transport block and HARQ information corresponding to the second transport block. For example, the HARQ information corresponding to the second transport block is a NACK, in other words, a decoding result is a failure, so that a first network device retransmits the second transport block. For example, the HARQ information corresponding to the first transport block is an ACK, in other words, a decoding result is a success, so that a second network device does not need to retransmit the first transport block. Therefore, use efficiency of system resources is improved. Therefore, through determining of the correspondence between a transport block and a codeword, feedback accuracy of the HARQ information can be improved, and therefore, the use efficiency of system resources is improved.

In another possible design, the first bit field included in the first DCI is at least one of the following: a first modulation and coding scheme MCS bit field, a first redundancy version RV bit field, a first count downlink assignment index C-DAI, a first total downlink assignment index T-DAI, and an indication field of a correspondence between the first transport block and the codeword.

In another possible design, that the first transport block is mapped to the first codeword is determined in at least the following several manners based on the first bit field included in the first DCI:

In a first manner, when the first bit field included in the first DCI is the first modulation and coding scheme MCS bit field and/or the first redundancy version RV bit field, the determining, based on first information, that the first transport block is mapped to a first codeword includes: determining, based on that an MCS index indicated by the first MCS bit field is a first MCS index and/or an RV indicated by the first RV bit field is a first RV value, that the first transport block is mapped to the first codeword. In the first manner, the terminal device may determine a mapping relationship between the first transport block and the first codeword by using a bit field that already exists in the first DCI, and no additional bit field needs to be added. Therefore, transmission efficiency can be effectively improved, and transmission resources can be saved.

In a second manner, when the first information is the first bit field included in the first DCI, the determining, based on first information, that the first transport block is mapped to a first codeword includes: when the first bit field included in the first DCI is a first T-DAI bit field and a second T-DAI bit field, determining, based on values of the first T-DAI bit field and the second T-DAI bit field, that the first transport block is mapped to the first codeword; or when the first bit field included in the first DCI is a first C-DAI bit field and a second C-DAI bit field, determining, based on values of the first C-DAI bit field and the second C-DAI bit field, that the first transport block is mapped to the first codeword; or when the first bit field included in the first DCI is a first T-DAI bit field and a second T-DAI bit field and a first C-DAI bit field and a second C-DAI bit field, determining, based on values of the first C-DAI bit field and the second C-DAI bit field and values of the first T-DAI bit field and the second T-DAI bit field, that the first transport block is mapped to the first codeword. In the second manner, even if a PDCCH is not detected, the terminal device may detect the PDCCH based on a C-DAI bit field and/or a T-DAI, in other words, may determine, by using a detected PDCCH, a codeword corresponding to an undetected PDCCH.

In another possible design, the network device may further determine, in at least the following two manners, that the terminal device has a capability of simultaneously receiving two transport blocks whose time-frequency resources entirely or partially overlap. Specifically, in a first manner, the terminal device sends first notification information, and the first notification information is used to notify the network device that the terminal device has the capability of simultaneously receiving two transport blocks whose time-frequency resources entirely or partially overlap. In a second manner, the terminal device receives first configuration information, and the first configuration information is used for performing configuration to indicate that the terminal device can simultaneously receive two transport blocks whose time-frequency resources entirely or partially overlap. In the foregoing two manners, when the terminal device sends the first notification information and/or the terminal device receives the first configuration information, the terminal device determines, by using the method in this application, a codeword to which a transport block is mapped. On the contrary, when the terminal device does not send the first notification information and/or the terminal device does not receive the first configuration information, the terminal device determines, by using the method in the conventional technology, a codeword to which a transport block is mapped. Therefore, the network device can determine, based on a capability of the terminal device or a current transmission policy, a manner for determining the codeword to which the transport block of the terminal device is mapped.

In another possible design, the first search space set in which the first DCI is located and the second search space set in which the second DCI is located are respectively a common search space set and a UE-specific search space set; the first DCI format corresponding to the first DCI and the second DCI format corresponding to the second DCI are respectively a DCI format 1_0 and a DCI format 1_1; and the first RNTI used for scrambling the first DCI and the second RNTI used for scrambling the second DCI are respectively a cell radio network temporary identifier C-RNTI and a modulation and coding scheme-cell radio network temporary identifier MCS-C-RNTI.

In another possible design, one or more of the following conditions are met between the first DCI and the second DCI: A PDCCH monitoring occasion on which a first physical downlink control channel PDCCH that carries the first DCI is located is the same as a PDCCH monitoring occasion on which a second PDCCH that carries the second DCI is located; or an aggregation level of a first PDCCH that carries the first DCI is the same as an aggregation level of a second PDCCH that carries the second DCI; or antenna port information indicated by the first DCI is different from antenna port information indicated by the second DCI. In the foregoing solution, when the foregoing condition is met between the first DCI and the second DCI, the network device may simultaneously transmit same information to the terminal device through different PDCCHs, thereby improving data transmission reliability, or the network device simultaneously transmits different information to the terminal device through different PDCCHs, thereby reducing data transmission latency.

In another possible design, one or more of the following conditions are met between the first transport block and the second transport block: A time-frequency resource on which the first transport block is located and a time-frequency resource on which the second transport block is located entirely or partially overlap; or an antenna port corresponding to a demodulation reference signal of the first transport block is different from an antenna port corresponding to a demodulation reference signal of the second transport block; or HARQ information corresponding to the first transport block and HARQ information corresponding to the second transport block are carried on a same uplink channel. In the foregoing solution, when the foregoing condition is met between the first transport block and the second transport block, the network device may simultaneously transmit same information to the terminal device through different PDCCHs, thereby improving data transmission reliability, or the network device simultaneously transmits different information to the terminal device through different PDCCHs, thereby reducing data transmission latency.

According to a second aspect, a method for determining a correspondence between a transport block and a codeword is provided, and includes:

A network device generates first downlink control information DCI, where the first DCI is used to indicate a terminal device to receive a first transport block on a first time-frequency resource, there is a mapping relationship between the first transport block and a first codeword, the first mapping relationship is determined based on first information, and the first information includes at least one of the following: a first search space set in which the first DCI is located, a first DCI format corresponding to the first DCI, a first radio network identifier RNTI used for scrambling the first DCI, or a first bit field included in the first DCI; and sends the first DCI to the terminal device.

In the foregoing solution, the network device generates DCI used to indicate a codeword to which a transport block is mapped, so that a mapping relationship between a transport block and a codeword is properly determined, and a decoding result of the transport block is correctly fed back. It may be understood that, when a solution in the conventional technology is used, DCI generated by the network device cannot be used to indicate the codeword to which the transport block is mapped. Therefore, the transport block is mapped to a codeword 0 by default, and when the network device sends a plurality of transport blocks, the terminal device cannot send decoding messages of the plurality of transport blocks to the network device. Specially, when the network device sends a plurality of transport blocks, but the terminal device receives only one transport block, if the terminal device feeds back one decoding message, the network device cannot learn whether another transport block is successfully transmitted. When the solution in this application is used, the network device generates the DCI used to indicate the codeword to which the transport block is mapped, and the transport block is mapped to the corresponding codeword based on a mapping relationship. If one or more transport blocks in a plurality of transport blocks sent by the network device are lost or fail to be received, but some transport blocks are received by the terminal device, the terminal device still sends, to the network device, a message indicating that the transport blocks fail to be received, thereby resolving a problem that the network device cannot learn whether another transport block is successfully transmitted.

In a possible design, the first bit field included in the first DCI is at least one of the following: a first modulation and coding scheme MCS bit field, a first redundancy version RV bit field, a first count downlink assignment index C-DAI, a first total downlink assignment index T-DAI, and an indication field of a correspondence between the first transport block and the codeword. In a specific implementation, the first bit field included in the first DCI is the first modulation and coding scheme MCS bit field and/or the first redundancy version RV bit field, an MCS index indicated by the first MCS bit field is a first MCS index, and an RV indicated by the first RV bit field is a first RV value.

In another possible design, the method further includes: The network device sends second DCI to the terminal device, where the second DCI is used to indicate the terminal device to receive a second transport block on a second time-frequency resource, there is a second mapping relationship between the second transport block and a second codeword, the second mapping relationship is determined based on second information, and the second information includes at least one of the following: a second search space set in which the second DCI is located, a second DCI format corresponding to the second DCI, a second RNTI used for scrambling the second DCI, a second bit field included in the second DCI, the first codeword, or the first mapping relationship.

In another possible design, the first information includes the first bit field included in the first DCI, and that the first mapping relationship is determined based on the first information includes: When the first bit field included in the first DCI is a first C-DAI bit field and a second C-DAI bit field, the first mapping relationship is determined based on the first C-DAI bit field and the second C-DAI bit field; or when the first bit field included in the first DCI is a first T-DAI bit field and a second T-DAI bit field, the first mapping relationship is determined based on the first T-DAI bit field and the second T-DAI bit field; or when the first bit field included in the first DCI is a first T-DAI bit field and a second T-DAI bit field and a first C-DAI bit field and a second C-DAI bit field, the first mapping relationship is determined based on the first C-DAI bit field and the first T-DAI bit field and the second C-DAI and the second T-DAI.

In another possible design, the network device may further determine, in at least the following two manners, that the terminal device has a capability of simultaneously receiving two transport blocks whose time-frequency resources entirely or partially overlap. Specifically, in a first manner, the terminal device sends first notification information, and the first notification information is used to notify the network device that the terminal device has the capability of simultaneously receiving two transport blocks whose time-frequency resources entirely or partially overlap. In a second manner, the terminal device receives first configuration information, and the first configuration information is used for performing configuration to indicate that the terminal device can simultaneously receive two transport blocks whose time-frequency resources entirely or partially overlap.

In another possible design, the first search space set in which the first DCI is located and the second search space set in which the second DCI is located are respectively a common search space set and a UE-specific search space set; the first DCI format corresponding to the first DCI and the second DCI format corresponding to the second DCI are respectively a DCI format 1_0 and a DCI format 1_1; and the first RNTI used for scrambling the first DCI and the second RNTI used for scrambling the second DCI are respectively a cell radio network temporary identifier C-RNTI and a modulation and coding scheme-cell radio network temporary identifier MCS-C-RNTI.

In another possible design, one or more of the following conditions are met between the first DCI and the second DCI: A PDCCH monitoring occasion on which a first physical downlink control channel PDCCH that carries the first DCI is located is the same as a PDCCH monitoring occasion on which a second PDCCH that carries the second DCI is located; or an aggregation level of a first PDCCH that carries the first DCI is the same as an aggregation level of a second PDCCH that carries the second DCI; or antenna port information indicated by the first DCI is different from antenna port information indicated by the second DCI.

In another possible design, one or more of the following conditions are met between the first transport block and the second transport block: A time-frequency resource on which the first transport block is located and a time-frequency resource on which the second transport block is located entirely or partially overlap; or an antenna port corresponding to a demodulation reference signal of the first transport block is different from an antenna port corresponding to a demodulation reference signal of the second transport block; or HARQ information corresponding to the first transport block and HARQ information corresponding to the second transport block are carried on a same uplink channel.

According to a third aspect, an apparatus for determining a correspondence between a transport block and a codeword is provided, and the apparatus has a function of implementing behavior of the terminal device in the foregoing method design. The function may be implemented by using hardware, or may be implemented by executing corresponding software by using hardware. The hardware or the software includes one or more modules corresponding to the foregoing function. The module may be software and/or hardware.

In a possible design, a structure of the apparatus includes a receiver and a processor, the receiver is configured to support the apparatus in receiving first DCI sent by the foregoing network device to the apparatus, and the first DCI is used to indicate the terminal device to receive a first transport block on a first time-frequency resource. The processor is configured to determine, based on first information, that the first transport block indicated by the first DCI received by the receiving module is mapped to a first codeword.

According to a fourth aspect, an apparatus for determining a correspondence between a transport block and a codeword is provided, and the apparatus has a function of implementing behavior of the network device in the foregoing method design. The function may be implemented by using hardware, or may be implemented by executing corresponding software by using hardware. The hardware or the software includes one or more modules corresponding to the foregoing function.

In a possible design, a structure of the apparatus includes a processor and a transmitter. The processor is configured to generate first DCI. The transmitter is configured to send, to the terminal device, the first DCI generated by the processing module. The apparatus may further include a memory, and the memory is configured to be coupled to the processor, and stores a program instruction and data that are necessary for the apparatus.

According to a fifth aspect, a terminal device is provided, and includes a processor and a memory, and the processor executes code in the memory, to perform the method according to any item of the first aspect.

According to a sixth aspect, a network device is provided, and includes a processor and a memory, and the processor executes code in the memory, to perform the method according to any item of the second aspect.

According to a seventh aspect, a computer non-transient storage medium is provided, and includes an instruction, and when the instruction is run on a terminal device, the terminal device is enabled to perform the method according to any item of the first aspect.

According to an eighth aspect, a computer non-transient storage medium is provided, and includes an instruction, and when the instruction is run on a network device, the network device is enabled to perform the method according to any item of the second aspect.

According to a ninth aspect, a communications system is provided, and includes a terminal device and a network device, where the terminal device and the network device can communicate with each other; where the terminal device is configured to perform the method according to any item of the first aspect; and the network device is configured to perform the method according to any item of the second aspect.

BRIEF DESCRIPTION OF THE DRAWINGS

To describe the technical solutions in the embodiments of this application or in the background more clearly, the following briefly describes the accompanying drawings for describing the embodiments of this application or the background.

DETAILED DESCRIPTION OF ILLUSTRATIVE EMBODIMENTS

Figure 1:
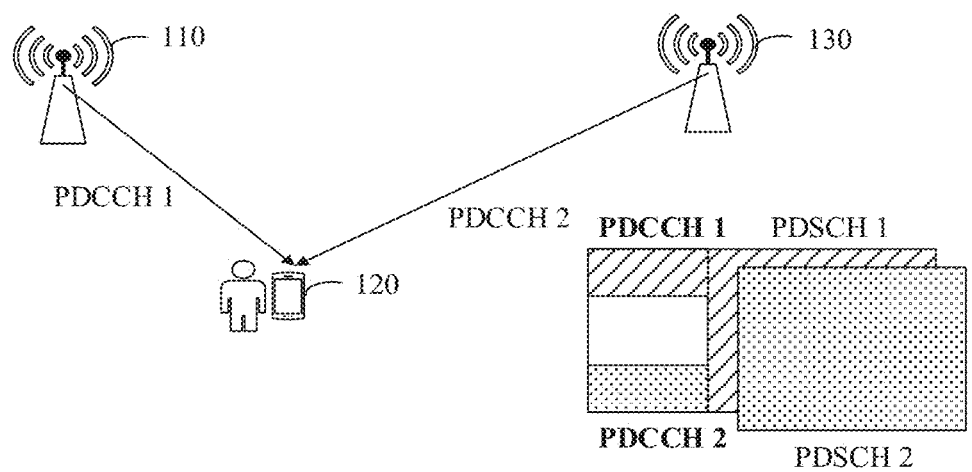
FIG. 1 is a schematic diagram of a multi-transmit/receive point scenario according to an embodiment of this application.

To improve rate experience of a cell edge user for NR, as shown in FIG. 1, a scenario in which a plurality of transmit/ receive points (Tx/Rx point, TRP) are used as network devices is introduced. The transmit/receive point may be an antenna, a radio frequency unit, a femto base station, a pico base station, a micro base station, an urban base station, or the like. This is not specifically limited herein. In a typical scenario, a first TRP 110 sends first DCI to a terminal device 120 through a first physical downlink control channel (PDCCH), where the first DCI is used to indicate the terminal device to receive a first transport block on a first time-frequency resource; and a second TRP 130 sends second downlink control information DCI to the terminal device 120 through a second PDCCH, where the second DCI is used to indicate the terminal device to receive a second transport block on a second time-frequency resource. The first time-frequency resource and the second time-frequency resource may overlap, or may not overlap.

Figure 2:
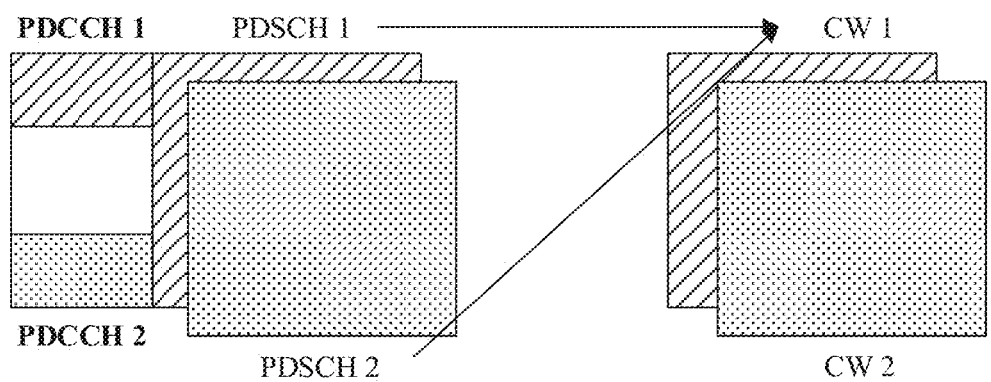
FIG. 2 is a schematic diagram of a mapping relationship between a transport block and a codeword according to an embodiment of this application.

As shown in FIG. 2, a first transport block and a second transport block are always mapped to a first CW, in other words, the first transport block and the second transport block are always mapped to a same CW. Because the terminal device obtains only one decoding result after decoding one CW, after decoding the first CW and obtaining a first decoding result, the terminal device feeds back the first decoding result to the first TRP and/or the second TRP. Therefore, if the terminal device fails to decode the first transport block and successfully decodes the second transport block, the terminal device may feed back only a NACK due to a limitation of an existing condition. Therefore, the first TRP retransmits the first transport block, and the second TRP also retransmits the second transport block. It may be learned that a method for determining a correspondence between a transport block and a codeword shown in FIG. 2 is improper.

To resolve the foregoing problem, this application proposes a method for determining a correspondence between a transport block and a codeword, a related device, and a system, so that the correspondence between a transport block and a codeword can be properly determined.

This application may be applied to a 5GNR system, or may be applied to another communications system, provided that one entity in the communications system needs to send transmission direction indication information, and another entity needs to receive the indication information and determine a transmission direction within a specific period of time according to the indication information.

Figure 3:
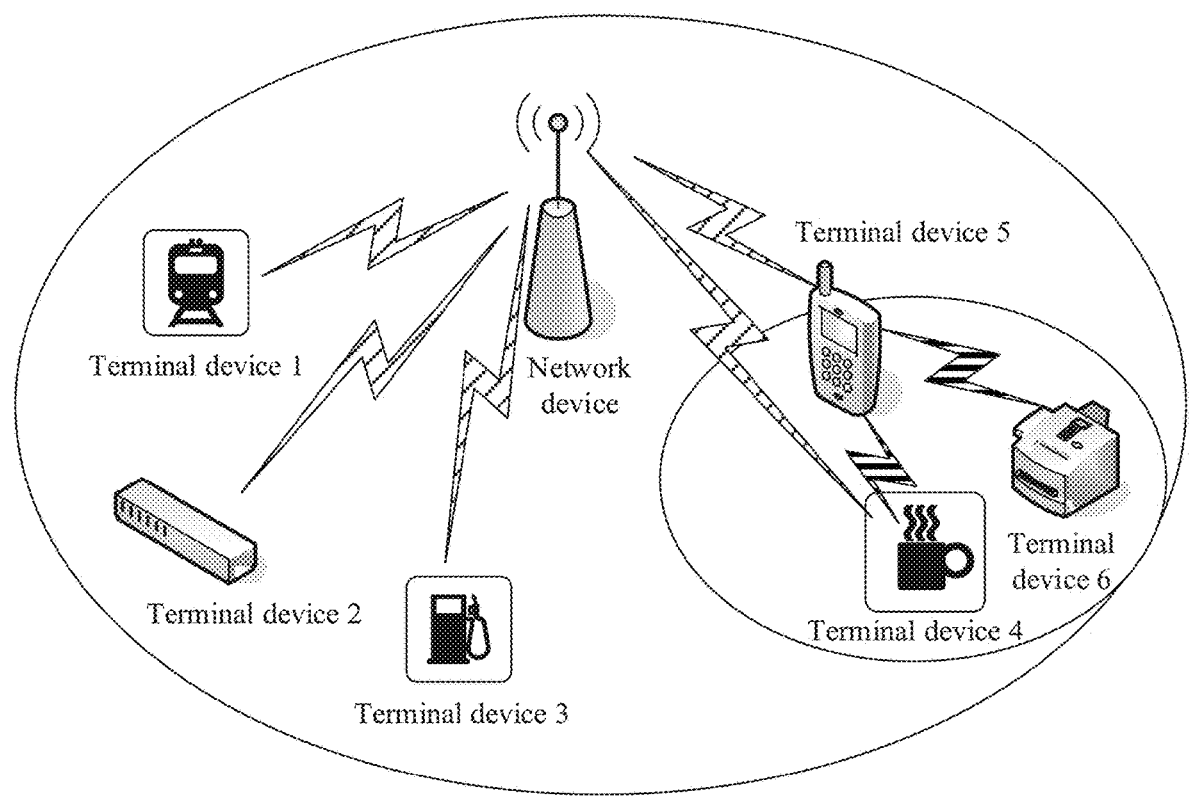
FIG. 3 is a schematic structural diagram of a communications system according to an embodiment of this application.

In a specific embodiment, as shown in FIG. 3, a network device and a terminal device 1 to a terminal device 6 constitute a communications system. In the communications system, the terminal device 1 to the terminal device 6 may send uplink data to a base station, and the network device needs to receive the uplink data sent by the terminal device 1 to the terminal device 6. In addition, the terminal device 4 to the terminal device 6 may also form a communications system. In the communications system, the network device may send downlink information to the terminal device 1, the terminal device 2, the terminal device, and the like. The terminal device 5 may also send downlink information to the terminal device 4 and the terminal device 6.

The network device may be a network-side entity configured to transmit or receive a signal, such as a new generation NodeB (new generation Node B, gNodeB). The network device may be alternatively a device configured to communicate with a mobile device. The network device may be an access point (AP) in a wireless local area network (Wireless LAN, WLAN), a base transceiver station (BTS) in a global system for mobile communications (GSM) or code division multiple access (CDMA), or a NodeB (base station) in wideband code division multiple access (WCDMA); or may be an evolved NodeB (Evolutional Node B, eNB or eNodeB) in long term evolution (LTE), a relay station, an access point, a vehicle-mounted device, a wearable device, a network device in a future 5G network, a network device in a future evolved public land mobile network (PLMN), a gNodeB in an NR system, or the like. In addition, in the embodiments of the present invention, the network device provides a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells are characterized by a small coverage area and low transmit power, and are applicable to providing a high-rate data transmission service.

The terminal device may be a user-side entity configured to receive or transmit a signal, such as new generation user equipment (new generation UE, gUE). The terminal device may also be referred to as a terminal device (User Equipment, UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may be a station (ST) in a wireless local area network (WLAN), and may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, a terminal device in a next-generation communications system such as a fifth-generation communications (fifth-generation, 5G) network, a terminal device in a future evolved public land mobile network (PLMN), or a terminal device in a new radio (NR) communications system. As an example instead of a limitation, in the embodiments of the present invention, the terminal device may be alternatively a wearable device. The wearable device may also be referred to as a wearable intelligent device, and is a general name of a wearable device that is developed after daily wear is intelligently designed by using a wearable technology, such as glasses, gloves, a watch, clothing, and shoes. The wearable device is a portable device that is directly worn on a body, or integrated into clothes or accessories of a user. The wearable device is not only a hardware device, but can also implement a powerful function by using software support, data interaction, and cloud interaction. A generalized wearable intelligent device includes smartwatches, smart glasses, or the like that have full functions and a large size and that may implement all or partial functions without depending on a smartphone, and focuses only on a specific type of application function and needs to be used together with another device such as a smartphone, for example, various types of smart bands and smart jewelry that perform physical sign monitoring.

Figures 4, 5:
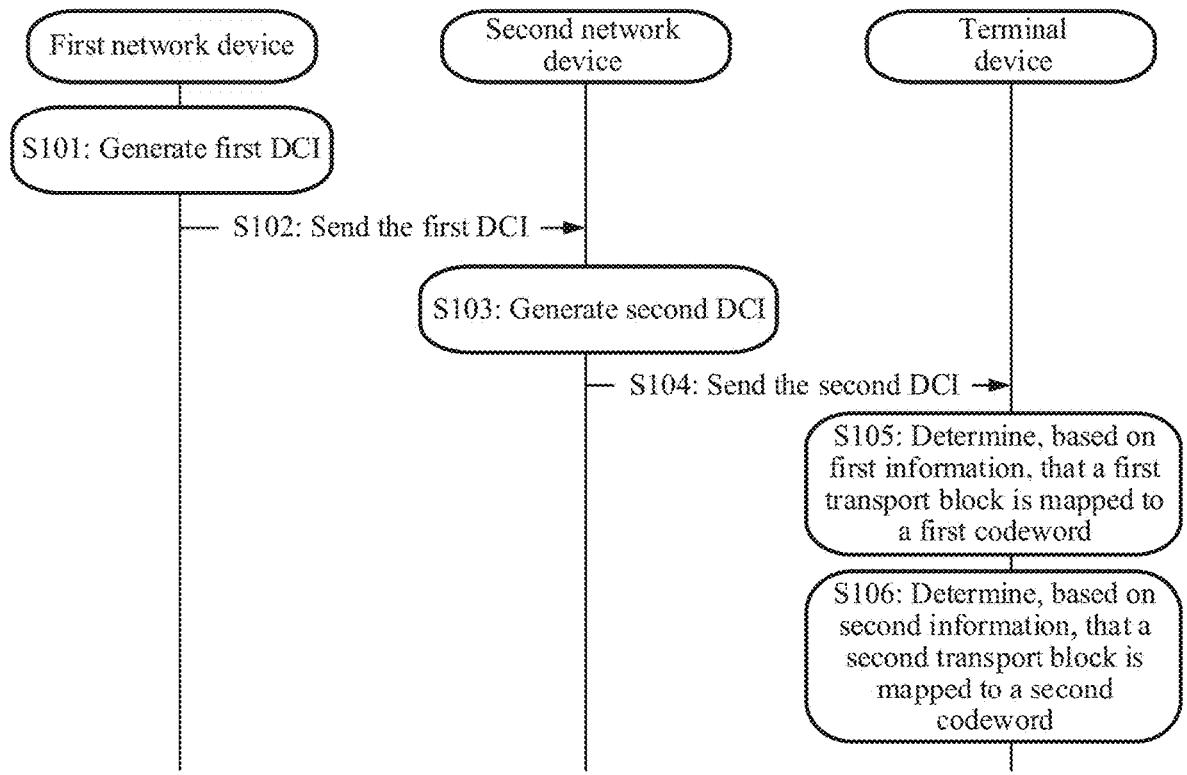
FIG. 4 is a schematic flowchart of a method for determining a correspondence between a transport block and a codeword according to an embodiment of this application.
FIG. 5 is a schematic structural diagram of DCI according to an embodiment of this application.

FIG. 4 is a schematic flowchart of a method for determining a correspondence between a transport block and a codeword according to an embodiment of this application. As shown in FIG. 4, the method for determining a correspondence between a transport block and a codeword in this embodiment of this application includes the following steps.

S101: A first network device generates first DCI, where the first DCI is used to indicate the terminal device to receive a first transport block on a first time-frequency resource. In a specific embodiment, the first DCI is carried on a first PDCCH channel, and the first transport block is carried on a first downlink channel. Optionally, the first downlink channel may be a first PDSCH.

S102: The first network device sends the first DCI to the terminal device, and correspondingly, the terminal device receives the first DCI sent by the first network device.

S103: A second network device generates second DCI, where the second DCI is used to indicate the terminal device to receive a second transport block on a second time-frequency resource.

In a specific embodiment, the second transport block is carried on a second downlink channel.

S104: The second network device sends the second DCI to the terminal device, and correspondingly, the terminal device receives the second DCI sent by the second network device.

In a specific embodiment, the second DCI is carried on a second PDCCH channel, and the second transport block is carried on a second downlink channel. For example, the second downlink channel may be a second PDSCH.

S105: The terminal device determines, based on first information, that the first transport block is mapped to a first codeword.

For example, the first information includes at least one of the following: a first search space set in which the first DCI is located, a first DCI format corresponding to the first DCI, a first radio network identifier RNTI used for scrambling the first DCI, and a first bit field included in the first DCI.

For example, the terminal device may determine, based on the first information, that the second transport block is mapped to a second codeword.

S106: The terminal device determines, based on second information, that the second transport block is mapped to the second codeword, where the second information includes at least one of the following: a second search space set in which the second DCI is located, a second DCI format corresponding to the second DCI, a second radio network identifier RNTI used for scrambling the second DCI, and a second bit field included in the second DCI. Optionally, the terminal device determines, based on the second information, that the first transport block is mapped to the first codeword.

It may be understood that, in the foregoing example, that step S103 and step S104 are performed after step S101 and step S102 is used as an example for description. However, in actual application, step S103 and step S104 may be performed simultaneously with step S101 and step S102, or step S103 and step S104 may be performed before step S101 and step S102. This is not specifically limited herein.

In this embodiment of this application, the terminal device may have a conflict problem of being mapped to hybrid automatic repeat request (HARQ) information corresponding to a same codeword. The HARQ information includes an acknowledgment (ACK) and/or a negative acknowledgement (NACK). Specifically, the terminal device may determine, based on the first information, that the first transport block is mapped to the first codeword, and that the second transport block is mapped to the second codeword. In other words, different transport blocks scheduled by different DCI may be mapped to different codewords, so that the terminal device can separately feed back HARQ information corresponding to the first transport block and HARQ information corresponding to the second transport block. If the HARQ information corresponding to the first transport block is a NACK, a decoding result is a failure, and therefore, the first network device retransmits the first transport block. In addition, if the HARQ information corresponding to the second transport block is an ACK, a decoding result is a success, and therefore, the second network device does not need to retransmit the second transport block. Therefore, use efficiency of system resources is improved. Therefore, through determining of the correspondence between a transport block and a codeword, feedback accuracy of the HARQ information can be improved, and therefore, the use efficiency of system resources is improved.

In a specific embodiment of this application, the first network device may be the first TRP shown in FIG. 1, and the second network device may be the second TRP shown in FIG. 2. Therefore, the problem between the first TRP and the second TRP in FIG. 1 also exists between the first network device and the second network device.

In a specific embodiment of this application, the first DCI is further used to indicate transmission information of the first downlink channel. For example, the transmission information of the first downlink channel includes at least one of the following: time-frequency resource information of the first downlink channel that carries the first transport block, modulation and coding scheme information of the first transport block, redundancy version information of the first transport block, reference signal information corresponding to the first transport block, and the like. It may be understood that the first DCI may be further used to carry transmission information of another first downlink channel. This is not specifically limited herein. There may be one or more first downlink channels herein. This is not specifically limited herein.

In a specific embodiment of this application, the second DCI is further used to indicate transmission information of the second downlink channel, for example, time-frequency resource information of the second downlink channel that carries the second transport block, modulation and coding scheme information of the second transport block, redundancy version information of the second transport block, and reference signal information corresponding to the second transport block. It may be understood that the second DCI may be further used to carry transmission information of another second downlink channel. This is not specifically limited herein. There may be one or more second downlink channels herein. This is not specifically limited herein.

In a specific embodiment of this application, the time-frequency resource information includes time domain information and/or frequency domain information. The frequency domain resource may be one or more resource blocks (RB), or may be one or more resource elements (RE), or may be one or more carriers/serving cells, or may be one or more bandwidth parts (BWP), or may be one or more RBs on one or more BWPs on one or more carriers, or may be one or more REs on one or more RBs on one or more BWPs on one or more carriers. The time domain resource may be one or more timeslots, or may be one or more symbols in one or more timeslots. The symbol may be an orthogonal frequency division multiplexing (OFDM) symbol. The OFDM symbol may use transform precoding, or may not use transform precoding. If transform precoding is used, the OFDM symbol may also be referred to as a single carrier-frequency division multiplexing (SC-FDM) symbol.

In a specific embodiment of this application, the modulation and coding scheme information includes a modulation scheme and a coding rate. The modulation scheme includes at least one of the following: binary phase shift keying (BPSK), quadrature phase shift keying (QPSK), 16 quadrature amplitude modulation (QAM), 64QAM, and 256QAM. The modulation scheme is generally represented by a modulation order. A modulation order 1 corresponds to pi/2 BPSK, a modulation order 2 corresponds to QPSK, a modulation order 4 corresponds to 16QAM, a modulation order 6 corresponds to 64QAM, and a modulation order 8 corresponds to 256QAM. A value of the coding rate×1024 includes a value greater than or equal to 30 and less than or equal to 948.

In a specific embodiment of this application, the redundancy version information includes one of {0, 1, 2, 3}.

In a specific embodiment of this application, the reference signal information includes an antenna port number.

In a specific embodiment of this application, higher-layer signaling may be signaling sent by a higher-layer protocol layer, and the higher-layer protocol layer is at least one protocol layer in protocol layers above a physical layer. The higher-layer protocol layer may be specifically at least one of the following protocol layers: a medium access control (MAC) layer, a radio link control (RLC) layer, a packet data convergence protocol (PDCP) layer, a radio resource control (RRC) layer, and a non-access stratum (NAS).

In a specific embodiment of this application, a manner in which the terminal device determines, based on the first information, that the first transport block is mapped to the first codeword, and/or a manner in which the terminal device determines, based on the second information, that the second transport block is mapped to the second codeword include/includes at least the following several manners:

In a first manner, the terminal device determines, based on the first bit field included in the first DCI, that the first transport block is mapped to the first codeword, and/or the terminal device determines, based on the second bit field included in the second DCI, that the second transport block is mapped to the second codeword. The first bit field included in the first DCI is at least one of the following: a first modulation and coding scheme MCS bit field, a first redundancy version RV bit field, a first count downlink assignment index C-DAI, a first total downlink assignment index T-DAI, and an indication field of a correspondence between the first transport block and the codeword. The second bit field included in the second DCI is at least one of the following: a second MCS bit field, a second RV bit field, a second C-DAI, a second T-DAI, and an indication field of a correspondence between the second transport block and the codeword.

In a specific embodiment, as shown in FIG. 5, DCI may include one or more bit fields. For example, when a maximum quantity of codewords supported by the terminal device is configured as 2, a plurality of bit fields may include a DCI format bit field of 1 bit, a frequency domain resource bit field of a plurality of bits, a first MCS bit field of 5 bits, a first RV bit field of 2 bits, a second MCS bit field of 5 bits, a second RV bit field of 2 bits, a DAI bit field of 4 bits (including a C-DAI and a T-DAI), a HARQ-ID bit field of 3 to 4 bits, a TPC command for PUCCH bit field of 2 bits, and the like. It should be understood that the foregoing bit field is merely an example, and should not constitute a specific limitation. It should be specially noted that in this embodiment of the present invention, the plurality of bit fields may include two or more bit fields.

Specifically, a specific implementation of the first manner includes at least the following several manners, and the several manners are separately described in detail below.

(1) The terminal device determines, based on the first MCS bit field and/or the first RV bit field included in the first DCI, that the first transport block is mapped to the first codeword, and/or the terminal device determines, based on the second MCS bit field and/or the second RV included in the second DCI, that the second transport block is mapped to the second codeword. Specifically:

Optionally, a maximum quantity, configured in any serving cell by using higher layer signaling, of codewords supported by the terminal device is 2.

It should be noted that a value of the bit field and/or the RV bit field in the foregoing solution may be a specific value, or may be a non-specific value. The specific value may be configured by using the higher layer signaling, or may be pre-defined. It may be understood that a value of the first MCS bit field is used to indicate a first MCS index, a value of the first RV bit field is used to indicate a first RV, a value of the second MCS bit field is used to indicate a second MCS index, and a value of the second RV bit field is used to indicate a second RV. For example, the specific value may be: MCS index=26 and RV=1, or MCS index=26 and RV=2, or MCS index=27 and RV=1, or MCS index=28 and RV=1. For example, the specific value may be: MCS index=26, 27, 28, 29, 30, or 31. For example, the specific value may be: RV=1, 2, 3, or 0. It should be understood that the specific values are merely examples, and should not constitute a specific limitation.

In a specific embodiment, for example, when the value of the first MCS bit field and/or the first RV bit field is the specific value, the terminal device determines, based on the value of the first MCS bit field and/or the first RV bit field, that the first transport block is mapped to the first codeword. For example, the first transport block corresponds to a transport block 1 (transport block 1) and the second transport block corresponds to a transport block 2 (transport block 2), and the first codeword is a codeword corresponding to the transport block 2. For example, the first transport block corresponds to a transport block 2 and the second transport block corresponds to a transport block 1, and the first codeword is a codeword corresponding to the transport block 1. For example, the value of the second MCS bit field and/or the second RV bit field is the non-specific value. When the value of the first MCS bit field and/or the first RV bit field is the non-specific value, the terminal device determines, based on the value of the first MCS bit field and/or the first RV bit field, that the first transport block is mapped to the first codeword. For example, the first transport block corresponds to a transport block 1 and the second transport block corresponds to a transport block 2, and the first codeword is a codeword corresponding to the transport block 1. For example, the first transport block corresponds to a transport block 2 and the second transport block corresponds to a transport block 1, and the first codeword is a codeword corresponding to the transport block 2. For example, the value of the second MCS bit field and/or the second RV bit field is the specific value. Similarly, it may be learned that the terminal device determines, based on that the value of the second MCS bit field and/or the second RV bit field is the specific value or the non-specific value, that the second transport block is mapped to the second codeword. For details, refer to content in which the terminal device determines, based on that the value of the first MCS bit field and/or the first RV bit field is the specific value or the non-specific value, that the first transport block is mapped to the first codeword. Details are not described herein again.

For example, a mapping relationship between the transport block 1 and a codeword 0 (codeword 0) and a mapping relationship between the transport block 2 and a codeword 1 (codeword 1) are determined by using higher layer signaling or are pre-defined. For example, the mapping relationship may be: a codeword corresponding to the transport block 1 is the codeword 0, and a codeword corresponding to the transport block 2 is the codeword 1; or a codeword corresponding to the transport block 1 is the codeword 1, and a codeword corresponding to the transport block 2 is the codeword 0. A mapping relationship between a transport block and a codeword is not limited in this application, provided that the terminal device can obtain a correspondence between a transport block and a codeword.

For example, a case in which the codeword corresponding to the transport block 1 is the codeword 0 and the codeword corresponding to the transport block 2 is the codeword 1 is determined by using the higher layer signaling or is pre-defined. It is assumed that the first transport block corresponds to the transport block 1 and the second transport block corresponds to the transport block 2, and the terminal device determines, based on that the value of the first MCS bit field and/or the first RV bit field is the non-specific value, that the codeword 0 corresponding to the transport block 1 is used as the first codeword for the first transport block. The terminal device determines, based on that the value of the second MCS bit field and/or the second RV bit field is the non-specific value, that the codeword 1 corresponding to the transport block 2 is used as the second codeword for the second transport block. Alternatively, the terminal device determines, based on that the value of the first MCS bit field and/or the first RV bit field is the specific value, that the codeword 1 corresponding to the transport block 2 is used as the first codeword for the first transport block. The terminal device determines, based on that the value of the second MCS bit field and/or the second RV bit field is the specific value, that the codeword 0 corresponding to the transport block 1 is used as the second codeword for the second transport block.

For another example, a case in which the codeword corresponding to the transport block 1 is the codeword 0 and the codeword corresponding to the transport block 2 is the codeword 1 is determined by using the higher layer signaling or is pre-defined. It is assumed that the first transport block corresponds to the transport block 2 and the second transport block corresponds to the transport block 1, and the terminal device determines, based on that the value of the first MCS bit field and/or the first RV bit field is the non-specific value, that the codeword 1 corresponding to the transport block 2 is used as the first codeword for the first transport block. The terminal device determines, based on that the value of the second MCS bit field and/or the second RV bit field is the non-specific value, that the codeword 0 corresponding to the transport block 1 is used as the second codeword for the second transport block. Alternatively, the terminal device determines, based on that the value of the first MCS bit field and/or the first RV bit field is the specific value, that the codeword 0 corresponding to the transport block 1 is used as the first codeword for the first transport block. The terminal device determines, based on that the value of the second MCS bit field and/or the second RV bit field is the specific value, that the codeword 1 corresponding to the transport block 2 is used as the second codeword for the second transport block.

(2) The terminal device determines, based on a first count downlink assignment index (Count-Downlink Assignment Index, C-DAI) bit field and/or a first total downlink assignment index (Total-Downlink Assignment Index, T-DAI) bit field, that the first transport block is mapped to the first codeword, and/or the terminal device determines, based on a second C-DAI bit field and/or a second T-DAI bit field, that the second transport block is mapped to the second codeword.

Specifically, a C-DAI is increased in a serving cell (carrier) first and then PDCCH monitoring occasion order, to be specific, is increased first in ascending order of carrier indexes, and then is increased in ascending order of PDCCH monitoring occasions. A physical meaning is as follows: The C-DAI is used to indicate a count index number corresponding to current PDSCH scheduling. A T-DAI is increased based on each PDCCH monitoring occasion. A physical meaning is as follows: The T-DAI is used to indicate a total quantity of scheduled PDSCHs until a current PDCCH monitoring occasion.

The C-DAI and the T-DAI are carried on downlink control information DCI corresponding to the PDSCH. If ACK/NACK feedback is performed on an uplink shared channel PUSCH, the T-DAI is further carried on downlink control information DCI corresponding to the PUSCH. To save a bit value in the DCI, the C-DAI and the T-DAI are 2 bits each, and cumulative count values expressed by four represented states {00, 01, 10, 11} may be separately {1, 2, 3, 4}. If a value is greater than 4, loop counting is performed, to be specific, {1, 2, 3, 4, 5(1), 6(2), 7(3), ... }. Specifically, this may be represented by the following formula: mod $(Y-1,4)+1=1$, where Y is an actually accumulated count value, for example, 1 to 7, and Y is a value obtained after a cyclic modulo operation, in other words, corresponds to the foregoing {1, 2, 3, 4, 1, 2, 3}. For example, when Y=1, 5, 9, ... , a value of the C-DAI is 1, and a value of the T-DAI is 1. For example, this is shown in Table 1.

TABLE 1

Loop counting table of C-DAI or T-DAI

| Bit state of a bit field | Value of a C-DAI or value of a T-DAI | Loop counting |
| --- | --- | --- |
| 00 | 1 | mod (Y − 1, 4) + 1 = 1 |
| 01 | 2 | mod (Y − 1, 4) + 1 = 2 |
| 10 | 3 | mod (Y − 1, 4) + 1 = 3 |
| 11 | 4 | mod (Y − 1, 4) + 1 = 4 |

Figure 6:
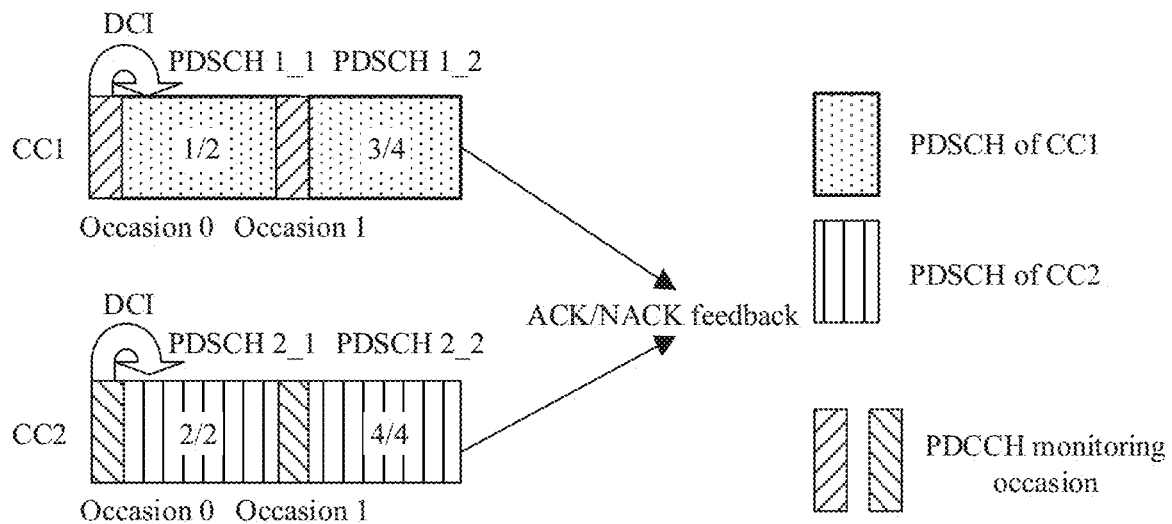
FIG. 6 is a schematic diagram of use of a C-DAI and a T-DAI according to an embodiment of this application.

A method for using the C-DAI and the T-DAI is described in detail below. As shown in FIG. 6, when two PDSCHs are scheduled on one PDCCH monitoring occasion, there are the following cases:

(Value of C-DAI)/(Value of T-DAI) carried in DCI used for scheduling a PDSCH 1_1 is ½. When the value of the C-DAI is 1, it indicates that the current PDSCH is the first scheduled PDSCH, and when the value of the T-DAI is 2, it indicates that a total of two PDSCHs are scheduled until a current PDCCH monitoring occasion.

(Value of C-DAI)/(Value of T-DAI) carried in DCI used for scheduling a PDSCH 2_1 is 2/2. When the value of the C-DAI is 2, it indicates that the current PDSCH is the second scheduled PDSCH, and when the value of the T-DAI is 2, it indicates that a total of two PDSCHs are scheduled until a current PDCCH monitoring occasion.

(Value of C-DAI)/(Value of T-DAI) carried in DCI used for scheduling a PDSCH 1_2 is ¾. When the value of the C-DAI is 3, it indicates that the current PDSCH is the third scheduled PDSCH, and when the value of the T-DAI is 4, it indicates that a total of four PDSCHs are scheduled until a current PDCCH monitoring occasion.

(Value of C-DAI)/(Value of T-DAI) carried in DCI used for scheduling a PDSCH 2_1 is 4/4. When the value of the C-DAI is 4, it indicates that the current PDSCH is the fourth scheduled PDSCH, and when the value of the T-DAI is 4, it indicates that a total of four PDSCHs are scheduled until a current PDCCH monitoring occasion.

Figure 7:
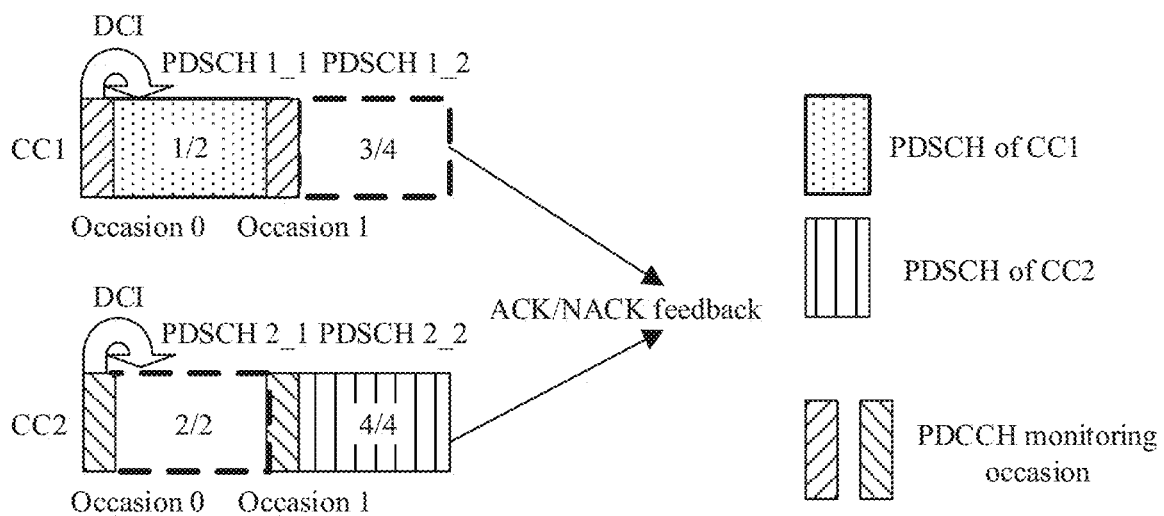
FIG. 7 is a schematic diagram of determining a missing transport block by using a C-DAI and a T-DAI according to an embodiment of this application.

As shown in FIG. 7, it is assumed that one of cases in which a PDCCH is not received occurs. As can be seen from FIG. 7, the terminal device knows that there should be two PDSCHs (½ and 2/2) on a PDCCH monitoring occasion 0, but only ½ is received, so that the UE can determine that the UE does not receive 2/2. When the terminal device subsequently receives 4/4, it indicates that the UE knows that four PDSCHs should be received on the previous PDCCH monitoring occasion 0 and PDCCH monitoring occasion 1. Except two known PDSCHs (one is the received ½, and the other is 2/2 that is determined to be not received) on the PDCCH monitoring occasion 0, ¾ is lost.

The terminal device determines, based on the first C-DAI bit field and/or the second T-DAI bit field, that the first transport block is mapped to the first codeword, and/or the terminal device determines, based on the second C-DAI bit field and/or the second T-DAI bit field, that the second transport block is mapped to the second codeword. This may be further divided into the following several manners:

(a) The terminal device determines, based on the value of the first C-DAI bit field and the value of the second C-DAI bit field, that the first transport block is mapped to the first codeword, and/or that the second transport block is mapped to the second codeword.

Optionally, the terminal device compares the value of the first C-DAI bit field with the value of the second C-DAI bit field. For example, when the value of the first C-DAI bit field is greater than the value of the second C-DAI bit field, it is determined that the first transport block is mapped to the first codeword, for example, the codeword 0; or when the value of the first C-DAI bit field is less than the value of the second C-DAI bit field, it is determined that the first transport block is mapped to the first codeword, for example, the codeword 1. Alternatively, for example, when the value of the first C-DAI bit field is greater than the value of the second C-DAI bit field, it is determined that the first transport block is mapped to the first codeword, for example, the codeword 1; or when the value of the first C-DAI bit field is less than the value of the second C-DAI bit field, it is determined that the first transport block is mapped to the first codeword, for example, the codeword 0. Codewords corresponding to a relatively large value and a relatively small value of the C-DAI bit field may be pre-defined or configured by using higher layer signaling.

For example, when the value of the first C-DAI is 1 and the value of the second C-DAI is 2, the terminal device determines that the first transport block is mapped to the first codeword, namely, the codeword 0, and/or the terminal device determines that the second transport block is mapped to the second codeword, namely, the codeword 1.

(b) The terminal device determines, based on the value of the first T-DAI bit field and the value of the second T-DAI bit field, that the first transport block is mapped to the first codeword, and/or that the second transport block is mapped to the second codeword.

Optionally, the terminal device compares the value of the first T-DAI bit field with the value of the second T-DAI bit field. For example, when the value of the first T-DAI bit field is greater than the value of the second T-DAI bit field, it is determined that the first transport block is mapped to the first codeword, for example, the codeword 0; or when the value of the first T-DAI bit field is less than the value of the second T-DAI bit field, it is determined that the first transport block is mapped to the first codeword, for example, the codeword 1. Alternatively, for example, when the value of the first T-DAI bit field is greater than the value of the second T-DAI bit field, it is determined that the first transport block is mapped to the first codeword, for example, the codeword 1; or when the value of the first T-DAI bit field is less than the value of the second T-DAI bit field, it is determined that the first transport block is mapped to the first codeword, for example, the codeword 0. Codewords corresponding to a relatively large value and a relatively small value of the T-DAI bit field may be pre-defined or configured by using higher layer signaling.

For example, when the value of the first T-DAI is 2 and the value of the second T-DAI is 4, the terminal device determines that the first transport block is mapped to the first codeword, and/or the terminal device determines that the second transport block is mapped to the second codeword.

(c) The terminal device determines, based on the values of the first C-DAI bit field and the second C-DAI bit field and the values of the first T-DAI bit field and the second T-DAI bit field, that the first transport block is mapped to the first codeword, and/or that the second transport block is mapped to the second codeword.

Optionally, the terminal device first compares the value of the first T-DAI bit field with the value of the second T-DAI bit field. If the value of the first T-DAI bit field is different from the value of the second T-DAI bit field, the terminal device performs the manner (b). If the value of the first T-DAI bit field is the same as the value of the second T-DAI bit field, the terminal device performs the manner (a).

For example, the value of the first C-DAI bit field is 1, the value of the first T-DAI bit field is 2, the value of the second C-DAI bit field is 2, and the value of the first T-DAI bit field is 2. Because the value of the first T-DAI bit field is the same as the value of the second T-DAI bit field, the terminal device may perform the manner (a), to be specific, the terminal device may determine, based on the value of the first C-DAI bit field and the value of the second C-DAI bit field, that the first transport block is mapped to the first codeword, and/or that the second transport block is mapped to the second codeword.

For example, the value of the first C-DAI bit field is 1, the value of the first T-DAI bit field is 2, the value of the second C-DAI bit field is 3, and the value of the first T-DAI bit field is 4. Because the value of the first T-DAI bit field is different from the value of the second T-DAI bit field, the terminal device performs the manner (b), to be specific, the terminal device may determine, based on the value of the first T-DAI bit field and the value of the second T-DAI bit field, that the first transport block is mapped to the first codeword, and/or that the second transport block is mapped to the second codeword.

It should be understood that the foregoing examples are merely used for description, and should not constitute a specific limitation. In another implementation, a correspondence between a transport block and a codeword may be determined based on a value of another C-DAI bit field and a value of another T-DAI bit field. Codewords corresponding to a relatively large value and a relatively small value of the C-DAI and the T-DAI may be pre-defined or configured by using higher layer signaling. For example, the correspondence may be: When the value of the first T-DAI bit field is different from the value of the second T-DAI bit field, a transport block corresponding to a T-DAI with a smaller value is mapped to the codeword 0, and a transport block corresponding to a T-DAI with a larger value is mapped to the codeword 1; or when the value of the first T-DAI bit field is the same as the value of the second T-DAI bit field, a transport block corresponding to a C-DAI with a smaller value is mapped to the codeword 0, and a transport block corresponding to a C-DAI with a larger value is mapped to the codeword 1. For another example, the correspondence may be: When the value of the first T-DAI bit field is different from the value of the second T-DAI bit field, a transport block corresponding to a T-DAI with a smaller value is mapped to the codeword 1, and a transport block corresponding to a T-DAI with a larger value is mapped to the codeword 0; or when the value of the first T-DAI bit field is the same as the value of the second T-DAI bit field, a transport block corresponding to a C-DAI with a smaller value is mapped to the codeword 1, and a transport block corresponding to a C-DAI with a larger value is mapped to the codeword 0. For another example, the correspondence may be: When the value of the first T-DAI bit field is different from the value of the second T-DAI bit field, a transport block corresponding to a T-DAI with a smaller value is mapped to the codeword 0, and a transport block corresponding to a T-DAI with a larger value is mapped to the codeword 0; or when the value of the first T-DAI bit field is the same as the value of the second T-DAI bit field, a transport block corresponding to a C-DAI with a smaller value is mapped to the codeword 0, and a transport block corresponding to a C-DAI with a larger value is mapped to the codeword 1. In other words, a correspondence between a value of the C-DAI and a codeword and a correspondence between a value of the T-DAI and a codeword may be the same or different. This is not limited in this application.

A function of the C-DAI and the T-DAI is used to identify whether a PDCCH is lost. Therefore, even if the terminal device does not receive the second DCI, the terminal device may determine, based on the C-DAI and/or the T-DAI, a C-DAI and/or a T-DAI corresponding to the lost second DCI, to further determine the first codeword to which the first transport block is mapped. Therefore, in the present invention, a codeword to which a transport block is mapped is implicitly determined by using a DAI, so that not only a prior-art problem that different transport blocks are mapped to a same codeword can be resolved, but also a problem that a PDCCH is not detected can be resolved, thereby improving system transmission reliability.

(3) The terminal device determines, based on the indication field that is of the correspondence between the first transport block and the codeword and that is included in the first DCI, that the first transport block is mapped to the first codeword, and/or the terminal device determines, based on the indication field of the correspondence between the second transport block and the codeword, that the second transport block is mapped to the second codeword.

Optionally, the indication field of the correspondence between the first transport block and the codeword or the indication field of the correspondence between the second transport block and the codeword is an extended bit field of the DCI, and the extended bit field may be 1 bit, 2 bits, 3 bits, or greater than 3 bits. This is not specifically limited herein.

Specifically, the indication field of the correspondence between the first transport block and the codeword or the indication field of the correspondence between the second transport block and the codeword is used to indicate a mapping relationship between one transport block and one codeword. For example, the indication field of the correspondence between the first transport block and the codeword is 1 bit. When a value of the indication field that is of the correspondence between the first transport block and the codeword and that is included in the first DCI is 0, the terminal device determines that the first transport block is mapped to the first codeword, for example, the first codeword is the codeword 0; and when the value of the indication field that is of the correspondence between the first transport block and the codeword and that is included in the first DCI is 1, the terminal device determines that the first transport block is mapped to the first codeword, for example, the first codeword is the codeword 1. Alternatively, when a value of the indication field that is of the correspondence between the first transport block and the codeword and that is included in the first DCI is 0, the terminal device determines that the first transport block is mapped to the first codeword, for example, the first codeword is the codeword 1; and when the value of the indication field that is of the correspondence between the first transport block and the codeword and that is included in the first DCI is 1, the terminal device determines that the first transport block is mapped to the first codeword, for example, the first codeword is the codeword 0. Similarly, the terminal device determines, based on a value of the indication field that is of the correspondence between the second transport block and the codeword and that is included in the second DCI, that the second transport block is mapped to the second codeword. Details are not described herein.

Specifically, the indication field of the correspondence between the first transport block and the codeword or the indication field of the correspondence between the second transport block and the codeword is used to indicate a mapping relationship between at least two transport blocks and at least two codewords. For example, the indication field of the correspondence between the first transport block and the codeword is 2 bits. If the value of the indication field that is of the correspondence between the first transport block and the codeword and that is included in the first DCI is 01, it is determined that the first transport block is mapped to the first codeword. If a value of a codeword indication field included in the first DCI is 10, it is determined that the second transport block is mapped to the second codeword. If the value of the codeword indication field included in the first DCI is 11, it is determined that the first transport block is mapped to the first codeword, for example, the codeword 0, and that the second transport block is mapped to the second codeword, for example, the codeword 1. If a value of a codeword indication field included in the second DCI is 11, it is determined that the first transport block is mapped to the first codeword, for example, the codeword 1, and that the second transport block is mapped to the second codeword, for example, the codeword 0. Further, the indication field of the correspondence between the first transport block and the codeword may further indicate that the first transport block and the second transport block are mapped to a same codeword. For example, if the value of the codeword indication field included in the first DCI is 00, it is determined that the first transport block and the second transport block are mapped to the first codeword, for example, the codeword 0. It may be understood that in this case, the two transport blocks carry same data packet information.

Optionally, the correspondence between a transport block and a codeword is configured by using higher layer signaling or is pre-defined. The terminal device obtains the correspondence between a transport block and a codeword.

Therefore, in the present invention, a codeword to which a transport block is mapped is explicitly indicated by using an indication field that is of a correspondence between a transport block and a codeword and that is in DCI, so that a prior-art problem that different transport blocks are mapped to a same codeword can be resolved, and system transmission efficiency is improved.

In a second manner, the terminal device determines, based on the first search space set in which the first DCI is located, that the first transport block is mapped to the first codeword, and/or the terminal device determines, based on the second search space set in which the second DCI is located, that the second transport block is mapped to the second codeword.

Search space includes common search space (CSS) or UE-specific search space (UE specific search space, USS). An RNTI includes a system information RNTI (system information-RNTI, SI-RNTI), a temporary cell RNTI (temporary cell-RNTI, TC-RNTI), a paging RNTI (paging-RNTI, P-RNTI), a cell RNTI (cell-RNTI, C-RNTI), a configured scheduling RNTI (configured scheduling-RNTI, CS-RNTI), and a modulation and coding scheme-cell RNTI (modulation and coding scheme-cell-RNTI, MCS-C-RNTI).

The search space set is a set including a group of candidate PDCCHs that can be monitored by the terminal device. The search space set may include a common search space set (CSSS) and a UE-specific search space set (UE-SSS). Each PDCCH may scramble CRC of the PDCCH by using the RNTI, and the terminal device may also distinguish different PDCCH channels by using the RNTI. One user may monitor the candidate PDCCH in one or more of the following search space sets.

The common search space set may include one or more of the following: a Type0-PDCCH common search space set, a Type0A-PDCCH common search space set, a Type1-PDCCH common search space set, a Type2-PDCCH common search space set, and a Type3-PDCCH common search space set.

A candidate PDCCH in the Type0-PDCCH common search space set is configured by using higher layer signaling (for example, searchspacezero), and an RNTI used for scrambling the PDCCH is an SI-RNTI.

A candidate PDCCH in the Type0A-PDCCH common search space set is configured by using higher layer signaling (for example, searchspace-osi), and an RNTI used for scrambling the PDCCH is an SI-RNTI.

A candidate PDCCH in the Type1-PDCCH common search space set is configured by using higher layer signaling (for example, ra-searchspace), and an RNTI used for scrambling the PDCCH is an RA-RNTI or a TC-RNT.

A candidate PDCCH in the Type2-PDCCH common search space set is configured by using higher layer signaling (for example, pagingsearchspace), and an RNTI used for scrambling the PDCCH is a P-RNTI.

A candidate PDCCH in the Type3-PDCCH common search space set is configured by using higher layer signaling (for example, searchspace), and an RNTI used for scrambling the PDCCH is a C-RNTI, a CS-RNTI, an MCS-C-RNTI, or another RNTI.

A candidate PDCCH in the UE-specific search space set is configured by using higher layer signaling (for example, searchspace), and an RNTI used for scrambling the PDCCH is a C-RNTI, a CS-RNTI, or an MCS-C-RNTI.

Optionally, a correspondence between a search space set and a codeword is configured by using higher layer signaling or is pre-defined. The terminal device obtains the correspondence between a search space set and a codeword.

Specifically, a specific implementation of the second manner includes at least the following several manners, and the several manners are separately described in detail below.

(1) For example, the common search space set corresponds to the codeword 0, and the UE-specific search space set corresponds to the codeword 1. Alternatively, for example, the common search space set corresponds to the codeword 1, and the UE-specific search space set corresponds to the codeword 0. The terminal device determines, based on that the first search space set in which the first DCI is located is the common search space set, that the first transport block is mapped to the first codeword, for example, the first codeword is the codeword 0, and/or the terminal device determines, based on that the second search space set in which the second DCI is located is the UE-specific search space set, that the second transport block is mapped to the second codeword, for example, the second codeword is the codeword 1. On the contrary, the terminal device may also determine, based on that the first search space set in which the first DCI is located is the UE-specific search space set, that the first transport block is mapped to the first codeword, for example, the first codeword is the codeword 1, and/or the terminal device determines, based on that the second search space set in which the second DCI is located is the common search space set, that the second transport block is mapped to the second codeword, for example, the second codeword is the codeword 0.

(2) For example, a first common search space set corresponds to the codeword 0, and a second common search space set corresponds to the codeword 1. Alternatively, for example, a first common search space set corresponds to the codeword 1, and a second common search space set corresponds to the codeword 0. The terminal device determines, based on that the first search space set in which the first DCI is located is the first common search space set such as a Type0-PDCCH, that the first transport block is mapped to the first codeword, for example, the first codeword is the codeword 0, and/or the terminal device determines, based on that the second search space set in which the second DCI is located is the second common search space set such as a Type1-PDCCH, that the second transport block is mapped to the second codeword, for example, the first codeword is the codeword 1. On the contrary, the terminal device may also determine, based on that the first search space set in which the first DCI is located is the second common search space set, that the first transport block is mapped to the first codeword, for example, the first codeword is the codeword 1, and/or the terminal device determines, based on that the second search space set in which the second DCI is located is the first common search space set, that the second transport block is mapped to the second codeword, for example, the first codeword is the codeword 0.

(3) For example, a first UE-specific search space set corresponds to the codeword 0, and a second UE-specific search space set corresponds to the codeword 1. Alternatively, for example, a first UE-specific search space set corresponds to the codeword 1, and a second UE-specific search space set corresponds to the codeword 0. The terminal device determines, based on that the first search space set in which the first DCI is located is the first UE-specific search space set, that the first transport block is mapped to the first codeword, for example, the first codeword is the codeword 0, and/or the terminal device determines, based on that the second search space set in which the second DCI is located is the second UE-specific search space set, that the second transport block is mapped to the second codeword, for example, the first codeword is the codeword 1. On the contrary, the terminal device may also determine, based on that the first search space set in which the first DCI is located is the second UE-specific search space set, that the first transport block is mapped to the first codeword, for example, the first codeword is the codeword 1, and/or the terminal device determines, based on that the second search space set in which the second DCI is located is the first UE-specific search space set, that the second transport block is mapped to the second codeword, for example, the first codeword is the codeword 0.

It should be understood that, for example, the first search space set corresponds to the codeword 0, and the second search space set corresponds to the codeword 1. Alternatively, for example, the first search space set corresponds to the codeword 1, and the second search space set corresponds to the codeword 0. The foregoing examples of the search space set are merely used as examples, and should not constitute a specific limitation. When new search space appears in a 3G system, a 4G system, a 5G system, or even a future evolved system, the foregoing manner may also be used to determine the mapping relationship between a transport block and a codeword.

In this manner, even if a PDCCH is not detected, because the foregoing correspondence is unique, a codeword corresponding to the undetected PDCCH can also be determined by using a detected PDCCH. For example, even if only one PDCCH is detected in the UE-specific search space set, the terminal device may learn that another undetected PDCCH should be in the common search space set, in other words, a transport block corresponding to the undetected PDCCH should be mapped to a codeword corresponding to the common search space set. Therefore, in the present invention, a codeword to which a transport block is mapped is implicitly indicated by using the correspondence between a search space set and a codeword, so that a prior-art problem that different transport blocks are mapped to a same codeword can be resolved, thereby improving system transmission efficiency. In addition, in this implicit indication manner, no bit in the DCI needs to be introduced, thereby avoiding system overheads.

In a third manner, the terminal device determines, based on the first DCI format corresponding to the first DCI, that the first transport block is mapped to the first codeword, and the terminal device determines, based on the second DCI format corresponding to the second DCI, that the second transport block is mapped to the second codeword.

A DCI format is a format used by DCI. There are a plurality of DCI formats, for example, a DCI format 1_0, a DCI format 1_1, a DCI format 1_2, a DCI format 2_0, a DCI format 2_1, a DCI format 2_2, a DCI format 2_3, and a DCI format 2_5. Different DCI formats can carry different resources. In a specific implementation, the DCI format may be shown in Table 2.

TABLE 2

DCI format list

| DCI format | Carried bit field or corresponding function |
| --- | --- |
| DCI format 1_0 | DCI format indication bit field, frequency domain resource bit field, or the like, used to indicate PDSCH transmission |
| DCI format 1_1 | DCI format indication bit field, serving cell bit field, bandwidth part bit field, frequency domain resource bit field, or the like, used to indicate PDSCH transmission |
| DCI format 1_2 | Fewer bits are used than the DCI format 1_0 |
| DCI format 2_0 | Used to indicate a timeslot format |
| DCI format 2_1 | Used to indicate whether a time-frequency resource on which a previous PDSCH is located has a to-be-transmitted resource |
| DCI format 2_2 | Used to indicate a power control command word of an uplink channel |
| DCI format 2_3 | Used to indicate a power control command word of an uplink sounding signal |
| DCI format 2_5 | Used to indicate a correspondence between a transport block and a codeword |

Optionally, a correspondence between a DCI format and a codeword is configured by using higher layer signaling or is pre-defined. For example, the first DCI format corresponds to the codeword 0, and the second DCI format corresponds to the codeword 1. Alternatively, for example, the first DCI format corresponds to the codeword 1, and the second DCI format corresponds to the codeword 0. The terminal device obtains the correspondence between a DCI format and a codeword.

The terminal device determines, based on the DCI format 1_0 used by the first DCI, that the first transport block is mapped to the first codeword, for example, the first codeword is the codeword 0; and/or the terminal device determines, based on the DCI format 1_1 used by the second DCI, that the second transport block is mapped to the second codeword, for example, the second codeword is the codeword 1. On the contrary, the terminal device may also determine, based on the DCI format 1_1 used by the first DCI, that the first transport block is mapped to the first codeword, for example, the first codeword is the codeword 1; and/or the terminal device determines, based on the DCI format 1_0 used by the second DCI, that the second transport block is mapped to the second codeword, for example, the second codeword is the codeword 0.

It should be understood that, the foregoing examples of the DCI format 1_0 and the DCI format 1_1 are merely used as examples, and should not constitute a specific limitation. When a new DCI format appears in a 3G system, a 4G system, a 5G system, or even a future evolved system, the foregoing manner may also be used to determine the mapping relationship between a transport block and a codeword.

Therefore, in the present invention, a codeword to which a transport block is mapped is implicitly indicated by using the correspondence between a DCI format and a codeword, so that a prior-art problem that different transport blocks are mapped to a same codeword can be resolved, thereby improving system transmission efficiency. In addition, in this implicit indication manner, no additional bit in the DCI needs to be introduced, thereby avoiding additional system overheads. In this manner, even if a PDCCH is not detected, because the foregoing correspondence is unique, a codeword corresponding to a transport block indicated by the undetected PDCCH can also be determined by using a detected PDCCH. For example, even on a PDCCH on which the first DCI format is detected, the terminal device can learn that another undetected PDCCH should be in the second DCI format, in other words, a transport block indicated by the undetected PDCCH should be mapped to a codeword corresponding to the second DCI format.

In a fourth manner, the terminal device determines, based on the first RNTI used for scrambling the first DCI, that the first transport block is mapped to the first codeword, and/or the terminal device determines, based on the second RNTI used for scrambling the second DCI, that the second transport block is mapped to the second codeword.

The RNTI involved in the foregoing manner may be used to scramble cyclic redundancy check (CRC) of the PDCCH, where scrambling is to multiply spreading code by one pseudo random code sequence to encrypt a signal. There are a plurality of types of RNTIs, for example, a system information RNTI, a temporary cell RNTI, a paging RNTI, a random access RNTI, a cell RNTI, a configured scheduling RNTI, a cell radio network temporary identifier (C-RNTI), and a modulation and coding scheme-cell RNTI (MCS-C-RNTI).

MCS information of DCI scrambled by using the MCS-C-RNTI is MCS information whose spectrum efficiency is 0.0586 in an MCS table. The MCS-C-RNTI may indicate lower spectrum efficiency, in other words, may be applied to high-reliability transmission. In a specific embodiment, the MCS table may be shown in Table 3 or Table 4. It should be understood that the MCS table is merely used for description, and should not constitute a specific limitation.

TABLE 3

MCS Table 1

| MCS index $I_{MCS}$ | Modulation order $Q_m$ | Coding rate Rx [1024] | Spectrum efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 |  | Reserved |
| 30 | 4 |  | reserved |
| 31 | 6 |  | reserved |

TABLE 4

MCS Table 2

| MCS index $I_{MCS}$ | Modulation order $Q_m$ | Coding rate Rx [1024] | Spectrum efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |

TABLE 4-continued

MCS Table 2

| MCS index $I_{MCS}$ | Modulation order $Q_m$ | Coding rate Rx [1024] | Spectrum efficiency |
|---|---|---|---|
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | | reserved |
| 29 | 2 | | reserved |
| 30 | 4 | | reserved |
| 31 | 6 | | reserved |

It may be understood that, an MCS index corresponding to spectrum efficiency 0.0586 in Table 3 or Table 4 is 0. In another example, MCS including spectrum efficiency 0.0586 may be alternatively in another representation form. This is not specifically limited in this embodiment of this application.

Optionally, a correspondence between an RNTI and a codeword is configured by using higher layer signaling or is pre-defined. For example, the first RNTI corresponds to the codeword 0, and the second RNTI corresponds to the codeword 1. Alternatively, for example, the first RNTI corresponds to the codeword 1, and the second RNTI corresponds to the codeword 0. The terminal device obtains the correspondence between an RNTI and a codeword.

For example, the first RNTI is a C-RNTI, and the second RNTI is an MCS-C-RNTI. The terminal device determines, based on that the RNTI used for scrambling the first DCI is the C-RNTI, that the first transport block is mapped to the first codeword, for example, the first codeword is the codeword 0; and/or the terminal device determines, based on that the RNTI used for scrambling the second DCI is the MCS-C-RNTI, that the second transport block is mapped to the second codeword, for example, the second codeword is the codeword 1. On the contrary, the terminal device may alternatively determine, based on the MCS-C-RNTI used for scrambling the first DCI, that the first transport block is mapped to the first codeword, for example, the first codeword is the codeword 1; and/or the terminal device determines, based on the C-RNTI used for scrambling the second DCI, that the second transport block is mapped to the second codeword, for example, the second codeword is the codeword 0.

It should be understood that, the foregoing examples of the C-RNTI and the MCS-C-RNTI are merely used as examples, and may be alternatively other RNTIs, and should not constitute a specific limitation. When a new RNTI appears in a 3G system, a 4G system, a 5G system, or even a future evolved system, the foregoing manner may also be used to determine the mapping relationship between a transport block and a codeword.

In this manner, even if a PDCCH is not detected, because the foregoing correspondence is unique, a codeword corresponding to the undetected PDCCH can also be determined by using a detected PDCCH. For example, even if only a PDCCH corresponding to the first RNTI is detected, the terminal device can learn that another undetected PDCCH corresponds to the second RNTI, in other words, a transport block indicated by the undetected PDCCH is mapped to a codeword corresponding to the second RNTI. Therefore, in the technical solution used in this application, a codeword to which a transport block is mapped is implicitly indicated by using the correspondence between an RNTI and a codeword, so that a prior-art problem that different transport blocks are mapped to a same codeword can be resolved, thereby improving system transmission efficiency. In addition, in this implicit indication manner, no additional bit in the DCI needs to be introduced, thereby avoiding system overheads.

A plurality of implementations in which the terminal device determines, in the foregoing first to fourth manners, that the first transport block is mapped to the first codeword are described in detail above. Certainly, two or more implementations in the plurality of different implementations may be used in combination, to determine that the first transport block is mapped to the first codeword, and/or that the second transport block is mapped to the second codeword.

In the following combined method, the first mapping relationship is that the first transport block is mapped to the codeword 0, the second mapping relationship is that the first transport block is mapped to the codeword 0, a third mapping relationship is that the first transport block is mapped to the codeword 0, and a fourth mapping relationship is that the first transport block is mapped to the codeword 1; or the first mapping relationship is that the second transport block is mapped to the codeword 1, the second mapping relationship is that the second transport block is mapped to the codeword 1, a third mapping relationship is that the second transport block is mapped to the codeword 1, and a fourth mapping relationship is that the second transport block is mapped to the codeword 0; or a fifth mapping relationship is that the first transport block is mapped to the codeword 0 and the second transport block is mapped to the codeword 1, a sixth mapping relationship is that the first transport block and the second transport block are mapped to the codeword 0, a seventh mapping relationship is that the first transport block is mapped to the codeword 1 and the second transport block is mapped to the codeword 0, and an eighth mapping relationship is that the first transport block and the second transport block are mapped to the codeword 1. There may be alternatively another mapping relationship. This is not specifically limited in this application.

Manner 1: The terminal device determines, based on the first search space set in which the first DCI is located and the first RNTI used for scrambling the first DCI, that the first transport block is mapped to the first codeword.

Both a correspondence between the first search space set and the first codeword and a correspondence between the first RNTI and the first codeword may be configured by using higher layer signaling. Alternatively, some correspondences are configured by using higher layer signaling, and some correspondences are pre-defined. Alternatively, both correspondences are pre-defined. It may be understood that a correspondence configured by using higher layer signaling may be set in different fields of same higher layer signaling, or may be set by using different higher layer signaling.

Examples are shown in Table 5 and Table 6. It is assumed that the first search space set includes a common search space set CSS and a UE-specific search space set USS, and the first RNTI includes a first RNTI_1 and a second RNTI_2. For example, the first RNTI_1 and the second RNTI_2 are respectively a C-RNTI and an MCS-C-RNTI, or may be other RNTIs. This is not limited in the present invention. A correspondence between search space and the first codeword and the correspondence between the first RNTI and the first codeword may be alternatively other correspondences. This is not limited in this embodiment of this application.

TABLE 5

| Search space | First RNTI | Mapping relationship between a first transport block and a first codeword |
|---|---|---|
| CSS | First RNTI_1 | First mapping relationship |
| USS | First RNTI_1 | Second mapping relationship |
| CSS | First RNTI_2 | Third mapping relationship |
| USS | First RNTI_2 | Fourth mapping relationship |

TABLE 6

| Search space | First RNTI | Mapping relationship between a first transport block and a first codeword | Mapping relationship between a second transport block and a second codeword |
|---|---|---|---|
| CSS | First RNTI_1 | | Fifth mapping relationship |
| USS | First RNTI_1 | | Sixth mapping relationship |
| CSS | First RNTI_2 | | Seventh mapping relationship |
| USS | First RNTI_2 | | Eighth mapping relationship |

Manner 2: The terminal device determines, based on the first search space set in which the first DCI is located and the first DCI format corresponding to the first DCI, that the first transport block is mapped to the first codeword.

Both a correspondence between the first search space set and the first codeword and a correspondence between the first DCI format and the first codeword may be configured by using higher layer signaling. Alternatively, some correspondences are configured by using higher layer signaling, and some correspondences are pre-defined. Alternatively, both correspondences are pre-defined. It may be understood that a correspondence configured by using higher layer signaling may be set in different fields of same higher layer signaling, or may be set by using different higher layer signaling.

Examples are shown in Table 7 and Table 8. It is assumed that the first search space set includes a common search space set CSS and a UE-specific search space set USS, and the first DCI format includes a first DCI format_1 and a second DCI format_2. For example, the first DCI format_1 and the first DCI format_2 are respectively DCI 1_0 and DCI 1_1, or may be other formats. This is not limited in the present invention. The correspondence between the first search space set and the first codeword and the correspondence between the first DCI format and the first codeword may be alternatively other correspondences. This is not limited in this embodiment of this application.

TABLE 7

| Search space | First DCI format | Mapping relationship between a first transport block and a first codeword |
|---|---|---|
| CSS | First DCI format_1 | First mapping relationship |
| USS | First DCI format_1 | Second mapping relationship |
| CSS | First DCI format_2 | Third mapping relationship |
| USS | First DCI format_2 | Fourth mapping relationship |

TABLE 8

| Search space | First DCI format | Mapping relationship between a first transport block and a first codeword | Mapping relationship between a second transport block and a second codeword |
|---|---|---|---|
| CSS | First DCI format_1 | | Fifth mapping relationship |
| USS | First DCI format_1 | | Sixth mapping relationship |
| CSS | First DCI format_2 | | Seventh mapping relationship |
| USS | First DCI format_2 | | Eighth mapping relationship |

Manner 3: The terminal device determines, based on the first RNTI used for scrambling the first DCI and the first DCI format corresponding to the first DCI, that the first transport block is mapped to the first codeword.

Both a correspondence between the first RNTI and the first codeword and a correspondence between the first DCI format and the first codeword may be configured by using higher layer signaling. Alternatively, some correspondences are configured by using higher layer signaling, and some correspondences are pre-defined. Alternatively, both correspondences are pre-defined. It may be understood that a correspondence configured by using higher layer signaling may be set in different fields of same higher layer signaling, or may be set by using different higher layer signaling.

Examples are shown in Table 9 and Table 10. It is assumed that the first RNTI includes a first RNTI_1 and a second RNTI_2. For example, the first RNTI_1 and the second RNTI_2 are respectively a C-RNTI and an MCS-C-RNTI, or may be other RNTIs. This is not limited in the present invention. The first DCI format includes a first DCI format_1 and a first DCI format_2. For example, the first DCI format_1 and the first DCI format_2 are respectively DCI 1_0 and DCI 1_1, or may be other formats. This is not limited in the present invention. The correspondence between the first RNTI and the first codeword and the correspondence between the first DCI format and the first codeword may be alternatively other correspondences. This is not limited in this embodiment of this application.

TABLE 9

| First RNTI | First DCI format | Mapping relationship between a first transport block and a first codeword |
|---|---|---|
| First RNTI_1 | First DCI format_1 | First mapping relationship |
| First RNTI_1 | First DCI format_1 | Second mapping relationship |
| First RNTI_2 | First DCI format_2 | Third mapping relationship |
| First RNTI_2 | First DCI format_2 | Fourth mapping relationship |

TABLE 10

| First RNTI | First DCI format | Mapping relationship between a first transport block and a first codeword | Mapping relationship between a second transport block and a second codeword |
|---|---|---|---|
| First RNTI_1 | First DCI format_1 | | Fifth mapping relationship |
| First RNTI_1 | First DCI format_1 | | Sixth mapping relationship |
| First RNTI_2 | First DCI format_2 | | Seventh mapping relationship |
| First RNTI_2 | First DCI format_2 | | Eighth mapping relationship |

Manner 4: The terminal device determines, based on the first RNTI used for scrambling the first DCI and the first bit field included in the first DCI, that the first transport block is mapped to the first codeword.

Both a correspondence between the first RNTI and the first codeword and a correspondence between the first bit field and the first codeword may be configured by using higher layer signaling. Alternatively, some correspondences are configured by using higher layer signaling, and some correspondences are pre-defined. Alternatively, both correspondences are pre-defined. It may be understood that a correspondence configured by using higher layer signaling may be set in different fields of same higher layer signaling, or may be set by using different higher layer signaling.

Examples are shown in Table 11 and Table 12. It is assumed that the first RNTI includes a first RNTI_1 and a second RNTI_2. For example, the first RNTI_1 and the second RNTI_2 are respectively a C-RNTI and an MCS-C-RNTI, or may be other RNTIs. This is not limited in the present invention. The first bit field includes a first MCS bit field and/or a first RV bit field. The correspondence between the first bit field and the first codeword and the correspondence between the first RNTI and the first codeword may be alternatively other correspondences. This is not limited in this embodiment of this application.

TABLE 11

| First RNTI | First bit field | Mapping relationship between a first transport block and a first codeword |
|---|---|---|
| First RNTI_1 | Specific value | First mapping relationship |
| First RNTI_1 | Specific value | Second mapping relationship |
| First RNTI_2 | Non-specific value | Third mapping relationship |
| First RNTI_2 | Non-specific value | Fourth mapping relationship |

TABLE 12

| First RNTI | First bit field | Mapping relationship between a first transport block and a first codeword Mapping relationship between a second transport block and a second codeword |
|---|---|---|
| First RNTI_1 | Specific value | Fifth mapping relationship |
| First RNTI_1 | Specific value | Sixth mapping relationship |
| First RNTI_2 | Non-specific value | Seventh mapping relationship |
| First RNTI_2 | Non-specific value | Eighth mapping relationship |

Examples are shown in Table 13 and Table 14. An indication field that is of the correspondence between the first transport block and the codeword and that is included in the first bit field is 1 bit. The correspondence between the first bit field and the first codeword and the correspondence between the first RNTI and the first codeword may be alternatively other correspondences. This is not limited in this embodiment of this application.

TABLE 13

| First RNTI | First bit field | Mapping relationship between a first transport block and a first codeword |
|---|---|---|
| First RNTI_1 | 0 | First mapping relationship |
| First RNTI_1 | 0 | Second mapping relationship |
| First RNTI_2 | 1 | Third mapping relationship |
| First RNTI_2 | 1 | Fourth mapping relationship |

TABLE 14

| First RNTI | First bit field | Mapping relationship between a first transport block and a first codeword Mapping relationship between a second transport block and a second codeword |
|---|---|---|
| First RNTI_1 | 0 | Fifth mapping relationship |
| First RNTI_1 | 0 | Sixth mapping relationship |
| First RNTI_2 | 1 | Seventh mapping relationship |
| First RNTI_2 | 1 | Eighth mapping relationship |

Manner 5: The terminal device determines, based on the first DCI format corresponding to the first DCI and the first bit field included in the first DCI, that the first transport block is mapped to the first codeword.

Both a correspondence between the first DCI format and the first codeword and a correspondence between the first bit field and the first codeword may be configured by using higher layer signaling. Alternatively, some correspondences are configured by using higher layer signaling, and some correspondences are pre-defined. Alternatively, both correspondences are pre-defined. It may be understood that a correspondence configured by using higher layer signaling may be set in different fields of same higher layer signaling, or may be set by using different higher layer signaling.

Examples are shown in Table 15 and Table 16. It is assumed that the first DCI format includes a first DCI format_1 and a first DCI format_2. For example, the first DCI format_1 and the first DCI format_2 are respectively DCI 1_0 and DCI 1_1, or may be other formats. This is not limited in the present invention. The first bit field includes a first MCS bit field and/or a first RV bit field. The correspondence between the first bit field and the first codeword and the correspondence between the first DCI format and the first codeword may be alternatively other correspondences. This is not limited in this embodiment of this application.

TABLE 15

| First DCI format | First bit field | Mapping relationship between a first transport block and a first codeword |
|---|---|---|
| First DCI format_1 | Specific value | First mapping relationship |
| First DCI format_1 | Specific value | Second mapping relationship |
| First DCI format_2 | Non-specific value | Third mapping relationship |
| First DCI format_2 | Non-specific value | Fourth mapping relationship |

TABLE 16

| First DCI format | First bit field | Mapping relationship between a first transport block and a first codeword Mapping relationship between a second transport block and a second codeword |
|---|---|---|
| First DCI format_1 | Specific value | Fifth mapping relationship |
| First DCI format_1 | Specific value | Sixth mapping relationship |
| First DCI format_2 | Non-specific value | Seventh mapping relationship |
| First DCI format_2 | Non-specific value | Eighth mapping relationship |

Examples are shown in Table 17 and Table 18. An indication field that is of the correspondence between the first transport block and the codeword and that is included in the first bit field is 1 bit. The correspondence between the first bit field and the first codeword and the correspondence between the first DCI format and the first codeword may be alternatively other correspondences. This is not limited in this embodiment of this application.

TABLE 17

| First DCI format | First bit field | Mapping relationship between a first transport block and a first codeword |
| --- | --- | --- |
| First DCI format_1 | 0 | First mapping relationship |
| First DCI format_1 | 0 | Second mapping relationship |
| First DCI format_2 | 1 | Third mapping relationship |
| First DCI format_2 | 1 | Fourth mapping relationship |

TABLE 18

| First DCI format | First bit field | Mapping relationship between a first transport block and a first codeword Mapping relationship between a second transport block and a second codeword |
| --- | --- | --- |
| First DCI format_1 | 0 | Fifth mapping relationship |
| First DCI format_1 | 0 | Sixth mapping relationship |
| First DCI format_2 | 1 | Seventh mapping relationship |
| First DCI format_2 | 1 | Eighth mapping relationship |

Manner 6: The terminal device determines, based on the first search space set in which the first DCI is located and the first bit field included in the first DCI, that the first transport block is mapped to the first codeword.

Both a correspondence between the first search space set and the first codeword and a correspondence between the first bit field and the first codeword may be configured by using higher layer signaling. Alternatively, some correspondences are configured by using higher layer signaling, and some correspondences are pre-defined. Alternatively, both correspondences are pre-defined. It may be understood that a correspondence configured by using higher layer signaling may be set in different fields of same higher layer signaling, or may be set by using different higher layer signaling.

Examples are shown in Table 19 and Table 20. It is assumed that the first search space set includes a CSS and a USS, or may be other search space sets. This is not limited in the present invention. The first bit field includes a first MCS bit field and/or a first RV bit field. The correspondence between the first bit field and the first codeword and the correspondence between the first search space set and the first codeword may be alternatively other correspondences. This is not limited in this embodiment of this application.

TABLE 19

| First search space set | First bit field | Mapping relationship between a first transport block and a first codeword |
| --- | --- | --- |
| CSS | Specific value | First mapping relationship |
| USS | Specific value | Second mapping relationship |
| CSS | Non-specific value | Third mapping relationship |

TABLE 19-continued

| First search space set | First bit field | Mapping relationship between a first transport block and a first codeword |
| --- | --- | --- |
| USS | Non-specific value | Fourth mapping relationship |

TABLE 20

| First search space set | First bit field | Mapping relationship between a first transport block and a first codeword Mapping relationship between a second transport block and a second codeword |
| --- | --- | --- |
| CSS | Specific value | Fifth mapping relationship |
| USS | Specific value | Sixth mapping relationship |
| CSS | Non-specific value | Seventh mapping relationship |
| USS | Non-specific value | Eighth mapping relationship |

Examples are shown in Table 21 and Table 22. An indication field that is of the correspondence between the first transport block and the codeword and that is included in the first bit field is 1 bit. The correspondence between the first bit field and the first codeword and the correspondence between the first search space set and the first codeword may be alternatively other correspondences. This is not limited in this embodiment of this application.

TABLE 21

| First search space set | First bit field | Mapping relationship between a first transport block and a first codeword |
| --- | --- | --- |
| CSS | 0 | First mapping relationship |
| USS | 0 | Second mapping relationship |
| CSS | 1 | Third mapping relationship |
| USS | 1 | Fourth mapping relationship |

TABLE 22

| First search space set | First bit field | Mapping relationship between a first transport block and a first codeword Mapping relationship between a second transport block and a second codeword |
| --- | --- | --- |
| CSS | 0 | Fifth mapping relationship |
| USS | 0 | Sixth mapping relationship |
| CSS | 1 | Seventh mapping relationship |
| USS | 1 | Eighth mapping relationship |

Manner 7: The terminal device determines, based on the first search space set in which the first DCI is located, the first RNTI used for scrambling the first DCI, and the first DCI format corresponding to the first DCI, that the first transport block is mapped to the first codeword.

A correspondence between the first search space set and the first codeword, a correspondence between the first DCI format and the first codeword, and a correspondence between the first RNTI and the first codeword may all be configured by using higher layer signaling. Alternatively, some correspondences are configured by using higher layer signaling, and some correspondences are pre-defined. Alternatively, all the correspondences are pre-defined. It may be understood that a correspondence configured by using higher layer signaling may be set in different fields of same higher layer signaling, or may be set by using different higher layer signaling.

Examples are shown in Table 23 and Table 24. It is assumed that the first search space set includes a common search space set CSS and a UE-specific search space set USS, or may be other search space sets. This is not limited in the present invention. The first RNTI includes a first RNTI_1 and a second RNTI_2. For example, the first RNTI_1 and the second RNTI_2 are respectively a C-RNTI and an MCS-C-RNTI, or may be other RNTIs. The first DCI format includes a first DCI format_1 and a first DCI format_2. For example, the first DCI format_1 and the first DCI format_2 are respectively DCI 1_0 and DCI 1_1, or may be other formats. This is not limited in the present invention. The correspondence between the first search space set and the first codeword, the correspondence between the first DCI format and the first codeword, and the correspondence between the first RNTI and the first codeword may be alternatively other correspondences. This is not limited in this embodiment of this application.

TABLE 23

| First DCI format | Search space | First RNTI | Mapping relationship between a first transport block and a first codeword |
|---|---|---|---|
| First DCI format_1 | CSS | First RNTI_1 | First mapping relationship |
| First DCI format_1 | USS | First RNTI_1 | Second mapping relationship |
| First DCI format_2 | CSS | First RNTI_2 | Third mapping relationship |
| First DCI format_2 | USS | First RNTI_2 | Fourth mapping relationship |

TABLE 24

| First DCI format | Search space | First RNTI | Mapping relationship between a first transport block and a first codeword Mapping relationship between a second transport block and a second codeword |
|---|---|---|---|
| First DCI format_1 | CSS | First RNTI_1 | Fifth mapping relationship |
| First DCI format_1 | USS | First RNTI_1 | Sixth mapping relationship |
| First DCI format_2 | CSS | First RNTI_2 | Seventh mapping relationship |
| First DCI format_2 | USS | First RNTI_2 | Eighth mapping relationship |

Manner 8: The terminal device determines, based on the first search space set in which the first DCI is located, the first RNTI used for scrambling the first DCI, and the first bit field included in the first DCI, that the first transport block is mapped to the first codeword.

A correspondence between the first search space set and the first codeword, a correspondence between the first RNTI and the first codeword, and a correspondence between the first bit field and the first codeword may all be configured by using higher layer signaling. Alternatively, some correspondences are configured by using higher layer signaling, and some correspondences are pre-defined. Alternatively, all the correspondences are pre-defined. It may be understood that a correspondence configured by using higher layer signaling may be set in different fields of same higher layer signaling, or may be set by using different higher layer signaling.

Examples are shown in Table 25 and Table 26. It is assumed that the first search space set includes a CSS and a USS, or may be other search space sets. This is not limited in the present invention. The first RNTI includes a first RNTI_1 and a second RNTI_2. For example, the first RNTI_1 and the second RNTI_2 are respectively a C-RNTI and an MCS-C-RNTI, or may be other RNTIs. The first bit field includes a first MCS bit field and/or a first RV bit field. The correspondence between the first bit field and the first codeword, the correspondence between the first RNTI and the first codeword, and the correspondence between the first search space set and the first codeword may be alternatively other correspondences. This is not limited in this embodiment of this application.

TABLE 25

| First RNTI | First search space set | First bit field | Mapping relationship between a first transport block and a first codeword |
|---|---|---|---|
| First RNTI_1 | CSS | Specific value | First mapping relationship |
| First RNTI_1 | USS | Specific value | Second mapping relationship |
| First RNTI_2 | CSS | Non-specific value | Third mapping relationship |
| First RNTI_2 | USS | Non-specific value | Fourth mapping relationship |

TABLE 26

| First RNTI | First search space set | First bit field | Mapping relationship between a first transport block and a first codeword Mapping relationship between a second transport block and a second codeword |
|---|---|---|---|
| First RNTI_1 | CSS | Specific value | Fifth mapping relationship |
| First RNTI_1 | USS | Specific value | Sixth mapping relationship |
| First RNTI_2 | CSS | Non-specific value | Seventh mapping relationship |
| First RNTI_2 | USS | Non-specific value | Eighth mapping relationship |

Examples are shown in Table 27 and Table 28. An indication field that is of the correspondence between the first transport block and the codeword and that is included in the first bit field is 1 bit. The correspondence between the first bit field and the first codeword, the correspondence between the first RNTI and the first codeword, and the correspondence between the first search space set and the first codeword may be alternatively other correspondences. This is not limited in this embodiment of this application.

TABLE 27

| First RNTI | First search space set | First bit field | Mapping relationship between a first transport block and a first codeword |
|---|---|---|---|
| First RNTI_1 | CSS | 0 | First mapping relationship |
| First RNTI_1 | USS | 0 | Second mapping relationship |
| First RNTI_2 | CSS | 1 | Third mapping relationship |
| First RNTI_2 | USS | 1 | Fourth mapping relationship |

TABLE 28

| First RNTI | First search space set | First bit field | Mapping relationship between a first transport block and a first codeword Mapping relationship between a second transport block and a second codeword |
|---|---|---|---|
| First RNTI_1 | CSS | 0 | Fifth mapping relationship |
| First RNTI_1 | USS | 0 | Sixth mapping relationship |
| First RNTI_2 | CSS | 1 | Seventh mapping relationship |
| First RNTI_2 | USS | 1 | Eighth mapping relationship |

Manner 9: The terminal device determines, based on the first DCI format corresponding to the first DCI, the first RNTI used for scrambling the first DCI, and the first bit field included in the first DCI, that the first transport block is mapped to the first codeword.

A correspondence between the first RNTI and the first codeword, a correspondence between the first DCI format and the first codeword, and a correspondence between the first bit field and the first codeword may all be configured by using higher layer signaling. Alternatively, some correspondences are configured by using higher layer signaling, and some correspondences are pre-defined. Alternatively, all the correspondences are pre-defined. It may be understood that a correspondence configured by using higher layer signaling may be set in different fields of same higher layer signaling, or may be set by using different higher layer signaling.

Examples are shown in Table 29 and Table 30. It is assumed that the first DCI format includes a first DCI format_1 and a first DCI format_2. For example, the first DCI format_1 and the first DCI format_2 are respectively DCI 1_0 and DCI 1_1, or may be other formats. This is not limited in the present invention. The first RNTI includes a first RNTI_1 and a second RNTI_2. For example, the first RNTI_1 and the second RNTI_2 are respectively a C-RNTI and an MCS-C-RNTI, or may be other RNTIs. The first bit field includes a first MCS bit field and/or a first RV bit field. The correspondence between the first bit field and the first codeword, the correspondence between the first DCI format and the first codeword, and the correspondence between the first RNTI and the first codeword may be alternatively other correspondences. This is not limited in this embodiment of this application.

TABLE 29

| First RNTI | First DCI format | First bit field | Mapping relationship between a first transport block and a first codeword |
|---|---|---|---|
| First RNTI_1 | First DCI format_1 | Specific value | First mapping relationship |
| First RNTI_1 | First DCI format_1 | Specific value | Second mapping relationship |
| First RNTI_2 | First DCI format_2 | Non-specific value | Third mapping relationship |
| First RNTI_2 | First DCI format_2 | Non-specific value | Fourth mapping relationship |

TABLE 30

| First RNTI | First DCI format | First bit field | Mapping relationship between a first transport block and a first codeword Mapping relationship between a second transport block and a second codeword |
|---|---|---|---|
| First RNTI_1 | First DCI format_1 | Specific value | Fifth mapping relationship |
| First RNTI_1 | First DCI format_1 | Specific value | Sixth mapping relationship |
| First RNTI_2 | First DCI format_2 | Non-specific value | Seventh mapping relationship |
| First RNTI_2 | First DCI format_2 | Non-specific value | Eighth mapping relationship |

Examples are shown in Table 31 and Table 32. An indication field that is of the correspondence between the first transport block and the codeword and that is included in the first bit field is 1 bit. The correspondence between the first bit field and the first codeword, the correspondence between the first DCI format and the first codeword, and the correspondence between the first RNTI and the first codeword may be alternatively other correspondences. This is not limited in this embodiment of this application.

TABLE 31

| First RNTI | First DCI format | First bit field | Mapping relationship between a first transport block and a first codeword |
|---|---|---|---|
| First RNTI_1 | First DCI format_1 | 0 | First mapping relationship |
| First RNTI_1 | First DCI format_1 | 0 | Second mapping relationship |
| First RNTI_2 | First DCI format_2 | 1 | Third mapping relationship |
| First RNTI_2 | First DCI format_2 | 1 | Fourth mapping relationship |

TABLE 32

| First RNTI | First DCI format | First bit field | Mapping relationship between a first transport block and a first codeword Mapping relationship between a second transport block and a second codeword |
|---|---|---|---|
| First RNTI_1 | First DCI format_1 | 0 | Fifth mapping relationship |
| First RNTI_1 | First DCI format_1 | 0 | Sixth mapping relationship |
| First RNTI_2 | First DCI format_2 | 1 | Seventh mapping relationship |
| First RNTI_2 | First DCI format_2 | 1 | Eighth mapping relationship |

Manner 10: The terminal device determines, based on the first DCI format corresponding to the first DCI, the first search space set in which the first DCI is located, and the first bit field included in the first DCI, that the first transport block is mapped to the first codeword.

A correspondence between the first search space set and the first codeword, a correspondence between the first DCI format and the first codeword, and a correspondence between the first bit field and the first codeword may all be configured by using higher layer signaling. Alternatively, some correspondences are configured by using higher layer signaling, and some correspondences are pre-defined. Alternatively, all the correspondences are pre-defined. It may be understood that a correspondence configured by using higher layer signaling may be set in different fields of same higher layer signaling, or may be set by using different higher layer signaling.

Examples are shown in Table 33 and Table 34. It is assumed that the first DCI format includes a first DCI format_1 and a first DCI format_2. For example, the first DCI format_1 and the first DCI format_2 are respectively DCI 1_0 and DCI 1_1, or may be other formats. This is not limited in the present invention. It is assumed that the first search space set includes a CSS and a USS, or may be other search space sets. This is not limited in the present invention. The first bit field includes a first MCS bit field and/or a first RV bit field. The correspondence between the first bit field and the first codeword, the correspondence between the first DCI format and the first codeword, and the correspondence between the first DCI format and the first codeword may be alternatively other correspondences. This is not limited in this embodiment of this application.

TABLE 33

| First DCI format | First search space set | First bit field | Mapping relationship between a first transport block and a first codeword |
|---|---|---|---|
| First DCI format_1 | CSS | Specific value | First mapping relationship |
| First DCI format_1 | USS | Specific value | Second mapping relationship |
| First DCI format_2 | CSS | Non-specific value | Third mapping relationship |
| First DCI format_2 | USS | Non-specific value | Fourth mapping relationship |

TABLE 34

| First DCI format | First search space set | First bit field | Mapping relationship between a first transport block and a first codeword Mapping relationship between a second transport block and a second codeword |
|---|---|---|---|
| First DCI format_1 | CSS | Specific value | Fifth mapping relationship |
| First DCI format_1 | USS | Specific value | Sixth mapping relationship |
| First DCI format_2 | CSS | Non-specific value | Seventh mapping relationship |
| First DCI format_2 | USS | Non-specific value | Eighth mapping relationship |

Examples are shown in Table 35 and Table 36. An indication field that is of the correspondence between the first transport block and the codeword and that is included in the first bit field is 1 bit. The correspondence between the first bit field and the first codeword, the correspondence between the first DCI format and the first codeword, and the correspondence between the first search space set and the first codeword may be alternatively other correspondences. This is not limited in this embodiment of this application.

TABLE 35

| First DCI format | First search space set | First bit field | Mapping relationship between a first transport block and a first codeword |
|---|---|---|---|
| First DCI format_1 | CSS | 0 | First mapping relationship |
| First DCI format_1 | USS | 0 | Second mapping relationship |
| First DCI format_2 | CSS | 1 | Third mapping relationship |
| First DCI format_2 | USS | 1 | Fourth mapping relationship |

TABLE 36

| First DCI format | First search space set | First bit field | Mapping relationship between a first transport block and a first codeword Mapping relationship between a second transport block and a second codeword |
|---|---|---|---|
| First DCI format_1 | CSS | 0 | Fifth mapping relationship |
| First DCI format_1 | USS | 0 | Sixth mapping relationship |
| First DCI format_2 | CSS | 1 | Seventh mapping relationship |
| First DCI format_2 | USS | 1 | Eighth mapping relationship |

Manner 11: The terminal device determines, based on the first DCI format corresponding to the first DCI, the first RNTI used for scrambling the first DCI, the first search space set in which the first DCI is located, and the first bit field included in the first DCI, that the first transport block is mapped to the first codeword.

A correspondence between the first RNTI and the first codeword, a correspondence between the first search space set and the first codeword, a correspondence between the first DCI format and the first codeword, and a correspondence between the first bit field and the first codeword may all be configured by using higher layer signaling. Alternatively, some correspondences are configured by using higher layer signaling, and some correspondences are pre-defined. Alternatively, all the correspondences are pre-defined. It may be understood that a correspondence configured by using higher layer signaling may be set in different fields of same higher layer signaling, or may be set by using different higher layer signaling.

Examples are shown in Table 37 and Table 38. It is assumed that the first DCI format includes a first DCI format_1 and a first DCI format_2. For example, the first DCI format_1 and the first DCI format_2 are respectively DCI 1_0 and DCI 1_1, or may be other formats. This is not limited in the present invention. It is assumed that the first search space set includes a CSS and a USS, or may be other search space sets. This is not limited in the present invention.

The first RNTI includes a first RNTI_1 and a second RNTI_2. For example, the first RNTI_1 and the second RNTI_2 are respectively a C-RNTI and an MCS-C-RNTI, or may be other RNTIs. The first bit field includes a first MCS bit field and/or a first RV bit field. The correspondence between the first RNTI and the first codeword, the correspondence between the first bit field and the first codeword, the correspondence between the first DCI format and the first codeword, and the correspondence between the first search space set and the first codeword may be alternatively other correspondences. This is not limited in this embodiment of this application.

TABLE 37

| First DCI format | First RNTI | First search space set | First bit field | Mapping relationship between a first transport block and a first codeword |
|---|---|---|---|---|
| First DCI format_1 | First RNTI_1 | CSS | Specific value | First mapping relationship |
| First DCI format_1 | First RNTI_1 | USS | Specific value | Second mapping relationship |
| First DCI format_2 | First RNTI_2 | CSS | Non-specific value | Third mapping relationship |
| First DCI format_2 | First RNTI_2 | USS | Non-specific value | Fourth mapping relationship |

TABLE 38

| First DCI format | First RNTI | First search space set | First bit field | Mapping relationship between a first transport block and a first codeword Mapping relationship between a second transport block and a second codeword |
|---|---|---|---|---|
| First DCI format_1 | First RNTI_1 | CSS | Specific value | Fifth mapping relationship |
| First DCI format_1 | First RNTI_1 | USS | Specific value | Sixth mapping relationship |
| First DCI format_2 | First RNTI_2 | CSS | Non-specific value | Seventh mapping relationship |
| First DCI format 2 | First RNTI_2 | USS | Non-specific value | Eighth mapping relationship |

Examples are shown in Table 39 and Table 40. An indication field that is of the correspondence between the first transport block and the codeword and that is included in the first bit field is 1 bit. The correspondence between the first RNTI and the first codeword, the correspondence between the first bit field and the first codeword, the correspondence between the first DCI format and the first codeword, and the correspondence between the first search space set and the first codeword may be alternatively other correspondences. This is not limited in this embodiment of this application.

TABLE 39

| First DCI format | First RNTI | First search space set | First bit field | Mapping relationship between a first transport block and a first codeword |
|---|---|---|---|---|
| First DCI format_1 | First RNTI_1 | CSS | 0 | First mapping relationship |

TABLE 39-continued

| First DCI format | First RNTI | First search space set | First bit field | Mapping relationship between a first transport block and a first codeword |
|---|---|---|---|---|
| First DCI format_1 | First RNTI 1 | USS | 0 | Second mapping relationship |
| First DCI format_2 | First RNTI_2 | CSS | 1 | Third mapping relationship |
| First DCI format_2 | First RNTI_2 | USS | 1 | Fourth mapping relationship |

TABLE 40

| First DCI format | First RNTI | First search space set | First bit field | Mapping relationship between a first transport block and a first codeword Mapping relationship between a second transport block and a second codeword |
|---|---|---|---|---|
| First DCI format_1 | First RNTI_1 | CSS | 0 | Fifth mapping relationship |
| First DCI format_1 | First RNTI_1 | USS | 0 | Sixth mapping relationship |
| First DCI format_2 | First RNTI_2 | CSS | 1 | Seventh mapping relationship |
| First DCI format_2 | First RNTI_2 | USS | 1 | Eighth mapping relationship |

Content of each table in Table 5 to Table 40 may be entire content or may be partial content. All the foregoing tables fall within the protection scope of this application provided that the foregoing mapping relationship can be embodied. Table 40 is used as an example. For example, Table 40 may include fewer rows. Specifically, Table 40 may retain only the first row, or Table 40 may retain only the second row, or Table 40 may retain only the third row, or Table 40 may retain only the fourth row, or Table 40 may retain only content of the first row and the second row, or Table 40 may retain only content of the first row and the third row, or Table 40 may retain only content of the first row and the fourth row, or Table 40 may retain only content of the second row and the third row, or Table 40 may retain only content of the second row and the fourth row, or Table 40 may retain only content of the third row and the fourth row, or Table 40 may retain only content of the first row, the second row, and the third row, or Table 40 may retain only content of the first row, the second row, and the fourth row, or Table 40 may retain only content of the second row, the third row, and the fourth row, or the like. This is not specifically limited herein. To save space, content of each table in Table 5 to Table 39 is not described one by one by using an example. Table 5 to Table 39 may also use various example forms of the table in Table 40.

In addition, Table 5 to Table 40 may also include more rows. For example, the first DCI format_1, the first RNTI_1, the CSS, and the bit state of the first bit field being 1 correspond to the fifth mapping relationship. This is not described one by one as examples herein.

It should be understood that Table 5 to Table 22 are described by using an example in which the correspondence between a transport block and a codeword is determined with reference to two types of first information, Table 23 to Table 37 are described by using an example in which the correspondence between a transport block and a codeword is determined with reference to three types of first information, and Table 38 to Table 40 are described by using an example in which the correspondence between a transport block and a codeword is determined with reference to four types of first information. It may be understood that, in actual application, in addition to the manner of determining the correspondence between a transport block and a codeword with reference to two types of first information shown in Table 5 to Table 22, another manner of determining the correspondence between a transport block and a codeword with reference to two types of first information may be used; in addition to the manner of determining the correspondence between a transport block and a codeword with reference to three types of first manner shown in Table 23 to Table 37, another manner of determining the correspondence between a transport block and a codeword with reference to three types of first information may be used; and in addition to the manner of determining the correspondence between a transport block and a codeword with reference to four types of first manner shown in Table 38 to Table 40, another manner of determining the correspondence between a transport block and a codeword with reference to four types of first information may be used. The correspondence between a transport block and a code word may even be determined with reference to five or more types of first information. In addition, the first information is not limited to the foregoing several types of first information, or may be other first information, such as other first information in a future evolved system. This is not specifically limited herein.

In a specific embodiment of this application, before the method shown in FIG. 4 is performed, the network device further needs to determine that the terminal device has a capability of simultaneously receiving two transport blocks whose time-frequency resources entirely or partially overlap. Specifically, at least one of the following methods may be included.

In a first manner, the terminal device sends first notification information to the network device, and the first notification information is used to notify the network device that the terminal device has the capability of simultaneously receiving two transport blocks whose time-frequency resources entirely or partially overlap. Optionally, the terminal device sends second notification information to the network device, and the second notification information is used to notify the network device that the terminal device does not have the capability of simultaneously receiving two transport blocks whose time-frequency resources entirely or partially overlap. It may be understood that when the terminal device sends the second notification information, the terminal device determines the correspondence between a transport block and a codeword by using the conventional technology, and the terminal device does not need to perform joint reception in the manner shown in FIG. 1. In this case, a transport block indicated by the first DCI and a transport block indicated by the second DCI are not limited to different codewords of a same downlink channel, and therefore, a problem shown in FIG. 1 that a HARQ feedback conflict occurs on the terminal device does not appear. When the terminal device sends the first notification information, the terminal device may determine the correspondence between a transport block and a codeword by using the method in this application.

In a second manner, the terminal device sends third notification information to the network device, and the third notification information is used to notify the network device that the terminal device has a capability of supporting at least two PDCCHs in separately indicating different codewords. Optionally, the terminal device sends fourth notification information to the network device, and the fourth notification information is used to notify the network device that the terminal device does not have the capability of supporting at least two PDCCHs in separately indicating different codewords. It may be understood that when the terminal device sends the fourth notification information, the terminal device determines, by using the conventional technology, a codeword to which a transport block is mapped, and the terminal device does not need to perform joint reception in the manner shown in FIG. 1. In this case, a transport block indicated by the first DCI and a transport block indicated by the second DCI are not limited to different codewords of a same downlink channel, and therefore, a problem shown in FIG. 1 that a HARQ feedback conflict occurs on the terminal device does not appear. When the terminal device sends the third notification information, the terminal device may determine the correspondence between a transport block and a codeword by using the method in this application.

In a third manner, the terminal device sends fifth notification information to the network device, and the fifth notification information is used to notify the network device that the terminal device has a capability of jointly receiving transmission from different TRPs. Optionally, the terminal device sends sixth notification information to the network device, and the sixth notification information is used to notify the network device that the terminal device does not have the capability of jointly receiving transmission from different TRPs. It may be understood that when the terminal device sends the sixth notification information, the terminal device determines the correspondence between a transport block and a codeword by using the conventional technology, and the terminal device does not need to perform joint reception in the manner shown in FIG. 1. In this case, a transport block indicated by the first DCI and a transport block indicated by the second DCI are not limited to different codewords of a same downlink channel, and therefore, a problem shown in FIG. 1 that a HARQ feedback conflict occurs on the terminal device does not appear. When the terminal device sends the fifth notification information, the terminal device may determine the correspondence between a transport block and a codeword by using the method in this application.

In the first manner to the third manner, the terminal device reports corresponding capability information to the network device, so that the network device determines, based on the information, a capability supported by the terminal device, thereby improving communication efficiency for multi-TRP performed by the terminal device.

In a specific embodiment of this application, before the method shown in FIG. 4 is performed, the network device further needs to perform configuration to enable the terminal device to simultaneously receive two transport blocks whose time-frequency resources entirely or partially overlap. Specifically, at least one of the following methods may be included.

In a first manner, the network device sends first configuration information to the terminal device, and the first configuration information is used for performing configuration to indicate that the terminal device can simultaneously receive two transport blocks whose time-frequency resources entirely or partially overlap. Optionally, the network device sends second configuration information to the terminal device, and the second configuration information is used for performing configuration to indicate that the terminal device cannot simultaneously receive two transport blocks whose time-frequency resources entirely or partially overlap. It may be understood that when the terminal device sends the first configuration information, the terminal device determines the correspondence between a transport block and a codeword by using the conventional technology, and the terminal device does not need to perform joint reception in the manner shown in FIG. 1. In this case, a transport block indicated by the first DCI and a transport block indicated by the second DCI are not limited to different codewords of a same downlink channel, and therefore, a problem shown in FIG. 1 that a HARQ feedback conflict occurs on the terminal device does not appear. When the network device sends the second configuration information to the terminal device, the terminal device determines the correspondence between a transport block and a codeword by using the conventional technology.

In a second manner, the network device sends third configuration information to the terminal device, where the third configuration information is used for performing configuration to enable the terminal device to support at least two PDCCHs in separately indicating different codewords. Optionally, the network device sends fourth configuration information to the terminal device, and the fourth configuration information is used for performing configuration to indicate that the terminal device cannot support at least two PDCCHs in separately indicating different codewords. It may be understood that when the network device sends the fourth configuration information to the terminal device, the terminal device determines the correspondence between a transport block and a codeword by using the conventional technology, and the terminal device does not need to perform joint reception in the manner shown in FIG. 1. In this case, a transport block indicated by the first DCI and a transport block indicated by the second DCI are not limited to different codewords of a same downlink channel, and therefore, a problem shown in FIG. 1 that a HARQ feedback conflict occurs on the terminal device does not appear. When the network device sends the third configuration information to the terminal device, the terminal device may determine the correspondence between a transport block and a codeword by using the method in this application.

In a third manner, the network device sends fifth configuration information to the terminal device, and the fifth configuration information is used for performing configuration to enable the terminal device to have a capability of jointly receiving transmission from different TRPs. Optionally, the terminal device sends sixth configuration information to the network device, and the sixth configuration information is used for performing configuration so that the terminal device does not have the capability of jointly receiving transmission from different TRPs. It may be understood that when the network device sends the sixth configuration information to the terminal device, the terminal device determines, by using the conventional technology, a codeword to which a transport block is mapped, and the terminal device does not need to perform joint reception in the manner shown in FIG. 1. In this case, a transport block indicated by the first DCI and a transport block indicated by the second DCI are not limited to different codewords of a same downlink channel, and therefore, a problem shown in FIG. 1 that a HARQ feedback conflict occurs on the terminal device does not appear. When the network device sends the fifth configuration information to the terminal device, the terminal device may determine the correspondence between a transport block and a codeword by using the method in this application.

It should be understood that the foregoing two manners are merely used as examples. In another embodiment, another manner may be alternatively included.

In a specific embodiment of this application, the first DCI and the second DCI may further meet one or more of the following conditions:

(1) A PDCCH monitoring occasion on which a first PDCCH that carries the first DCI is located is the same as a PDCCH monitoring occasion on which a second PDCCH that carries the second DCI is located; and/or a search space set in which the first PDCCH that carries the first DCI is located is the same as a search space set in which the second PDCCH that carries the second DCI is located; and/or a control channel resource set in which the first PDCCH that carries the first DCI is located is the same as a control channel resource set in which the second PDCCH that carries the second DCI is located.

Specifically, because the first DCI and the second DCI are on a same PDCCH monitoring occasion, in a same search space set, or in a same control channel resource set, in this case, it may be considered that the two pieces of DCI are DCI from different TRPs, and the two pieces of DCI correspond to scheduling of different codewords. Therefore, the correspondence between a transport block and a codeword may be determined by using the method in the present invention. Optionally, if the first DCI and the second DCI are on different PDCCH monitoring occasions, and/or in different search space sets, and/or in different control channel resource sets, the terminal device may determine the correspondence between a transport block and a codeword based on the conventional technology, and the terminal device does not need to perform joint reception in the manner shown in FIG. 1. In this case, a transport block indicated by the first DCI and a transport block indicated by the second DCI are not limited to different codewords of a same downlink channel, and therefore, a problem shown in FIG. 1 that a HARQ feedback conflict occurs on the terminal device does not appear.

(2) An aggregation level of a first PDCCH that carries the first DCI is the same as an aggregation level of a second PDCCH that carries the second DCI. The aggregation level is one of a plurality of aggregation levels, and the plurality of aggregation levels include at least one of 1, 2, 4, 8, and 16.

The first PDCCH and the second PDCCH may use a same aggregation level. It may be understood as that, when the first PDCCH and the second PDCCH have the same aggregation level, the correspondence between a transport block and a codeword may be determined by using the method in this application, in other words, the first DCI and the second DCI separately indicate different codewords. On the contrary, when the first PDCCH and the second PDCCH have different aggregation levels, the terminal device may determine the correspondence between a transport block and a codeword based on the conventional technology, in other words, the first DCI and the second DCI do not separately indicate different CWs. In other words, when the first PDCCH and the second PDCCH have different aggregation levels, the terminal device does not need to perform joint reception in the manner shown in FIG. 1. In this case, a transport block indicated by the first DCI and a transport block indicated by the second DCI are not limited to different codewords of a same downlink channel, and therefore, a problem shown in FIG. 1 that a HARQ feedback conflict occurs on the terminal device does not appear.

(3) Antenna port information indicated by the first DCI and antenna port information indicated by the second DCI are different, and/or a DCI format of the first DCI and a DCI format of the second DCI are the same.

Specifically, when the first DCI and the second DCI correspond to a same DCI format, the correspondence between a transport block and a codeword may be determined by using the method in the present invention, in other words, the first DCI and the second DCI separately indicate different codewords. On the contrary, when the first DCI and the second DCI have different DCI formats, and the two pieces of DCI carry different DCI content, the terminal device may determine the correspondence between a transport block and a codeword based on the conventional technology, in other words, the first DCI and the second DCI do not separately indicate different codewords. In other words, when the first DCI and the second DCI have different DCI formats, the terminal device does not need to perform joint reception in the manner shown in FIG. 1. In this case, a transport block indicated by the first DCI and a transport block indicated by the second DCI are not limited to different codewords of a same downlink channel, and therefore, a problem shown in FIG. 1 that a HARQ feedback conflict occurs on the terminal device does not appear.

Specifically, the first DCI and the second DCI have different reference signal information (for example, different antenna ports). It may be understood as that, when the first DCI and the second DCI have different reference signal information, the correspondence between a transport block and a codeword may be determined by using the method in the present invention, in other words, the first DCI and the second DCI separately indicate different codewords. On the contrary, when the first DCI and the second DCI have same reference signal information, and the two pieces of DCI indicate same space, the terminal device may determine the correspondence between a transport block and a codeword based on the conventional technology, in other words, the first DCI and the second DCI do not separately indicate different codewords. In other words, when the first DCI and the second DCI have the same reference signal information, the terminal device does not need to perform joint reception in the manner shown in FIG. 1. In this case, a transport block indicated by the first DCI and a transport block indicated by the second DCI are not limited to different codewords of a same downlink channel, and therefore, a problem shown in FIG. 1 that a HARQ information feedback conflict occurs on the terminal device does not appear.

It should be noted that, the foregoing condition that needs to be met by the first DCI and the second DCI is merely an example, and should not constitute a specific limitation.

In a specific embodiment of this application, the first transport block and the second transport block may further meet one or more of the following conditions:

(1) A time-frequency resource on which the first transport block is located and a time-frequency resource on which the second transport block is located entirely overlap or partially overlap.

Specifically, when a resource on which the first transport block is located and a resource on which the second transport block is located partially overlap or entirely overlap in time domain, the correspondence between a transport block and a codeword may be determined by using the method in the present invention, in other words, the first transport block and the second transport block are separately mapped to different codewords. On the contrary, when the resource on which the first transport block is located and the resource on which the second transport block is located do not overlap in time domain, because the first transport block and the second transport block may be independently fed back and transmitted, the terminal device may determine the correspondence between a transport block and a codeword based on the conventional technology, in other words, the first transport block and the second transport block are not separately mapped to different codewords. In other words, when the resource on which the first transport block is located and the resource on which the second transport block is located do not overlap in time domain, the terminal device does not need to perform joint reception in the manner shown in FIG. 1. In this case, the first transport block and the second transport block are not limited to different codewords of a same downlink channel, and therefore, a problem shown in FIG. 1 that a HARQ information feedback conflict occurs on the terminal device does not appear.

Optionally, the resource on which the first transport block is located and the resource on which the second transport block is located overlap in frequency domain. Specifically, the resource on which the first transport block is located and the resource on which the second transport block is located are in a same downlink bandwidth part and/or are in a same serving cell.

(2) An antenna port corresponding to a demodulation reference signal of the first transport block is different from an antenna port corresponding to a demodulation reference signal of the second transport block.

Specifically, the demodulation reference signal of the first transport block and the demodulation reference signal of the second transport block separately correspond to different antenna ports. It may be understood as that when the demodulation reference signal of the first transport block and the demodulation reference signal of the second transport block separately correspond to different antenna ports, the correspondence between a transport block and a codeword may be determined by using the method in this application, in other words, the first transport block and the second transport block are separately mapped to different codewords. On the contrary, when the demodulation reference signal of the first transport block and the demodulation reference signal of the second transport block correspond to a same antenna port, the terminal device may determine the correspondence between a transport block and a codeword based on the conventional technology, in other words, the first transport block and the second transport block are not separately mapped to different codewords. In other words, when the demodulation reference signal of the first transport block and the demodulation reference signal of the second transport block correspond to the same antenna port, the terminal device does not need to perform joint reception in the manner shown in FIG. 1. In this case, the first transport block and the second transport block are not limited to different codewords of a same downlink channel, and therefore, a problem shown in FIG. 1 that a HARQ information feedback conflict occurs on the terminal device does not appear.

(3) HARQ information corresponding to the first transport block and HARQ information corresponding to the second transport block are carried on a same uplink channel.

Feedback information of the first transport block and feedback information of the second transport block are transmitted on a same PUSCH or PUCCH. It may be understood as that when the feedback information of the first transport block and the feedback information of the second transport block are transmitted on the same PUSCH or PUCCH, the correspondence between a transport block and a codeword may be determined by using the method in this application, in other words, the first transport block and the second transport block are separately mapped to different codewords. When the feedback information of the first transport block and the feedback information of the second transport block are transmitted on different PUSCHs or PUCCHs, because the first transport block and the second transport block may be independently fed back, the terminal device may determine the correspondence between a transport block and a codeword based on the conventional technology, in other words, the first transport block and the second transport block are not separately mapped to different codewords. In other words, when the feedback information of the first transport block and the feedback information of the second transport block are transmitted on different PUSCHs or PUCCHs, the terminal device does not need to perform joint reception in the manner shown in FIG. 1. In this case, the first transport block and the second transport block are not limited to different codewords of a same downlink channel, and therefore, a problem shown in FIG. 1 that a HARQ information feedback conflict occurs on the terminal device does not appear.

Figure 8:
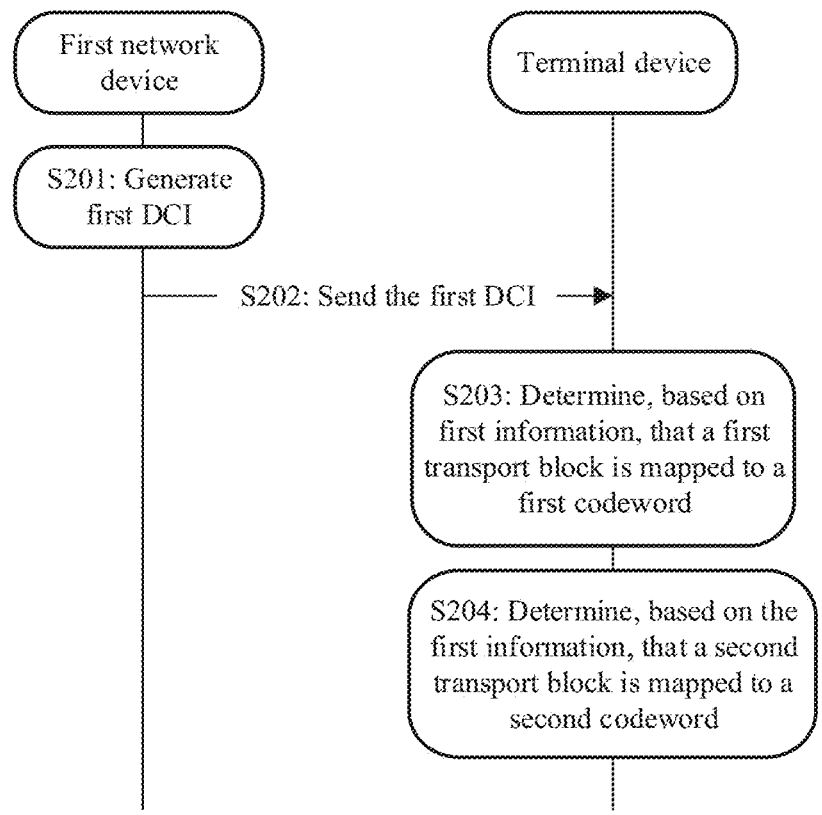
FIG. 8 is a schematic flowchart of another method for determining a correspondence between a transport block and a codeword according to an embodiment of this application.

FIG. 8 is a schematic flowchart of another method for determining a correspondence between a transport block and a codeword according to an embodiment of this application. As shown in FIG. 8, the method for determining a correspondence between a transport block and a codeword in this embodiment of this application includes the following steps.

S201: A first network device generates first DCI, where the first DCI is used to indicate the terminal device to receive a first transport block on a first time-frequency resource. In a specific embodiment, the first DCI is carried on a first PDCCH channel, and the first transport block is carried on a first downlink channel. Optionally, the first downlink channel may be a first PDSCH.

S202: The first network device receives the first DCI from the terminal device, and correspondingly, the terminal device receives the first DCI sent by the first network device.

S203: The terminal device determines, based on first information, that the first transport block is mapped to a first codeword, where the first information includes at least one of the following: a first search space set in which the first DCI is located, a first DCI format corresponding to the first DCI, a first radio network identifier RNTI used for scrambling the first DCI, and a first bit field included in the first DCI.

S204: The terminal device determines, based on the first information, that the second transport block is mapped to a second codeword.

A second TPR sends second DCI to the terminal device, and the second DCI is used to indicate the terminal device to receive the second transport block on a second time-frequency resource.

In this embodiment of this application, the terminal device may have a conflict problem of being mapped to HARQ information corresponding to a same codeword. The HARQ information includes an ACK and/or a NACK. Specifically, the terminal device may determine, based on the first information, that the first transport block is mapped to the first codeword, and that the second transport block is mapped to the second codeword. In other words, different transport blocks scheduled by different DCI may be mapped to different codewords, so that the terminal device can separately feed back HARQ information corresponding to the first transport block and HARQ information corresponding to the second transport block. If the HARQ information corresponding to the first transport block is a NACK, a decoding result is a failure, and therefore, the first network device retransmits the first transport block. In addition, if the HARQ information corresponding to the second transport block is an ACK, a decoding result is a success, and therefore, a second network device does not need to retransmit the second transport block. Therefore, use efficiency of system resources is improved. Therefore, through determining of the correspondence between a transport block and a codeword, feedback accuracy of the HARQ information can be improved, and therefore, the use efficiency of system resources is improved. In addition, even if the terminal device does not receive the second DCI, the terminal device may determine, based on the first information, that the second transport block is mapped to the second codeword, to indicate to retransmit the second transport block, thereby improving data transmission reliability.

In a specific embodiment of this application, the second network device does not send the second DCI, or the network device sends the second DCI, but the terminal device fails to detect the second DCI, and therefore, the terminal device does not receive the second transport block. Specifically, current codewords include only a codeword 0 and a codeword 1. Therefore, the terminal device may infer, by using a received codeword, a codeword corresponding to a transport block that is not received. For example, if the received first transport block corresponds to the codeword 0, the codeword 1 corresponding to the second transport block that is not received may be determined.

Optionally, after the terminal device receives first configuration information or sends first notification information, the terminal device assumes that transport blocks separately scheduled by two pieces of DCI correspond to different codewords. Alternatively, it is pre-defined that the terminal device assumes that transport blocks separately scheduled by two pieces of DCI correspond to different codewords. Therefore, the terminal device may determine that there is the second transport block. Therefore, even if the terminal device does not receive one of the transport blocks, the terminal device may determine, by using step 204, a codeword corresponding to the transport block that is not received.

Further, when the terminal device does not receive the second transport block, the terminal device fills a NACK in a HARQ feedback information location corresponding to the second codeword.

For simplicity, how the terminal device determines, based on the first information, that the first transport block is mapped to the first codeword is not described in detail herein. For details, refer to FIG. 4 and related content. The details are not described herein again.

Figure 9:
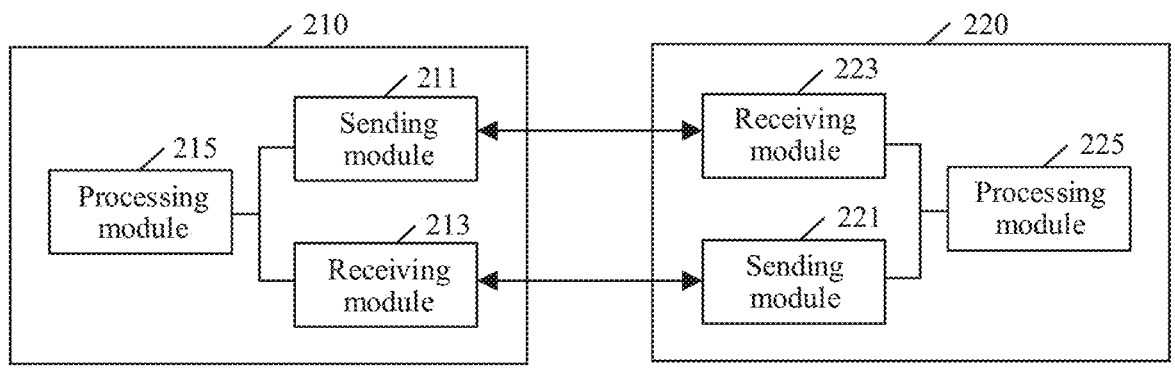
FIG. 9 is a schematic structural diagram of a communications system according to an embodiment of this application.

FIG. 9 is a schematic diagram of a communications system according to an embodiment of this application. As shown in FIG. 9, the communications system includes a terminal device 210 and a network device 220.

The terminal device 210 has a function of implementing behavior of the terminal device in the method design shown in FIG. 4 or FIG. 8. The function may be implemented by using hardware, or may be implemented by executing corresponding software by using hardware. The hardware or the software includes one or more modules corresponding to the foregoing function. In a specific embodiment, the terminal device 210 may include a sending module 211, a receiving module 213, and a processing module 215. The sending module 211 may be a software module, or may be a hardware module such as a transmitter. The receiving module 213 may be a software module, or may be a hardware module such as a receiver. The sending module 211 and the receiving module 213 may be separately disposed, or may be disposed in an integrated manner, for example, are a transceiver. The processing module 215 may be a software module, or may be a hardware module such as a processor. The processor may be a central processing unit, a digital processor, a baseband processing chip, an ARM, or the like. This is not specifically limited herein.

The receiving module 213 is configured to receive first downlink control information DCI, where the first DCI is used to indicate the terminal device to receive a first transport block on a first time-frequency resource.

The processing module 215 is configured to determine, based on first information, that the first transport block indicated by the first DCI received by the receiving module is mapped to a first codeword, where the first information includes at least one of the following: first search space in which the first DCI is located, a first DCI format corresponding to the first DCI, a first radio network identifier RNTI used for scrambling the first DCI, or a first bit field included in the first DCI.

The first bit field included in the first DCI is at least one of the following: a first modulation and coding scheme MCS bit field, a first redundancy version RV bit field, a first count downlink assignment index C-DAI, a first total downlink assignment index T-DAI, and an indication field of a correspondence between the first transport block and the codeword.

For example, the processing module 215 is configured to: when the first bit field included in the first DCI is a first modulation and coding scheme MCS bit field and/or a first redundancy version RV bit field, determine, based on that an MCS index indicated by the first MCS bit field is a first MCS index and/or an RV indicated by the first RV bit field is a first RV value, that the first transport block is mapped to the first codeword.

For example, the processing module 215 is further configured to: determine that there is a second transport block, and determine, based on the first information, that the second transport block is mapped to a second codeword, where the second codeword is different from the first codeword.

For example, the processing module 215 is further configured to: when the first bit field included in the first DCI is a first T-DAI bit field and a second T-DAI bit field, determine, based on values of the first T-DAI bit field and the second T-DAI bit field, that the first transport block is mapped to the first codeword; or for example, the processing module 215 is further configured to: when the first bit field included in the first DCI is a first C-DAI bit field and a second C-DAI bit field, determine, based on values of the first C-DAI bit field and the second C-DAI bit field, that the first transport block is mapped to the first codeword; or for example, the processing module 215 is further configured to: when the first bit field included in the first DCI is a first T-DAI bit field and a second T-DAI bit field and a first C-DAI bit field and a second C-DAI bit field, determine, based on values of the first C-DAI bit field and the second C-DAI bit field and values of the first T-DAI bit field and the second T-DAI bit field, that the first transport block is mapped to the first codeword.

For example, the receiving module 213 is further configured to receive second DCI, where the second DCI is used to indicate the terminal device to receive the second transport block on a second time-frequency resource. The processing module 215 is further configured to determine, based on second information, that the second transport block is mapped to the second codeword, where the second information includes at least one of the following: a second search space set in which the second DCI is located, a second DCI format corresponding to the second DCI, a second RNTI used for scrambling the second DCI, a second bit field included in the second DCI, or the first codeword.

For example, the apparatus further includes a sending module 217, configured to send first notification information, and the first notification information is used to notify the network device that the terminal device has a capability of simultaneously receiving two transport blocks whose time-frequency resources entirely or partially overlap.

For example, the receiving module 213 is configured to receive first configuration information, and the first configuration information is used for performing configuration to indicate that the terminal device can simultaneously receive two transport blocks whose time-frequency resources entirely or partially overlap.

For example, the first search space set in which the first DCI is located and the second search space set in which the second DCI is located are respectively a common search space set and a UE-specific search space set; the first DCI format corresponding to the first DCI and the second DCI format corresponding to the second DCI are respectively a DCI format 1_0 and a DCI format 1_1; and the first RNTI used for scrambling the first DCI and the second RNTI used for scrambling the second DCI are respectively a cell radio network temporary identifier C-RNTI and a modulation and coding scheme-cell radio network temporary identifier MCS-C-RNTI.

For example, a PDCCH monitoring occasion on which a first physical downlink control channel PDCCH that carries the first DCI is located is the same as a PDCCH monitoring occasion on which a second PDCCH that carries the second DCI is located; or an aggregation level of a first PDCCH that carries the first DCI is the same as an aggregation level of a second PDCCH that carries the second DCI; or antenna port information indicated by the first DCI is different from antenna port information indicated by the second DCI.

For example, a time-frequency resource on which the first transport block is located and a time-frequency resource on which the second transport block is located entirely or partially overlap; or an antenna port corresponding to a demodulation reference signal of the first transport block is different from an antenna port corresponding to a demodulation reference signal of the second transport block; or HARQ information corresponding to the first transport block and HARQ information corresponding to the second transport block are carried on a same uplink channel.

The terminal device may perform steps performed by the terminal device in the method for determining a correspondence between a transport block and a codeword shown in FIG. 4 and FIG. 8. Details are not described herein again. For the details, refer to FIG. 4, FIG. 8, and related content.

The network device 220 has a function of implementing behavior of the network device in the foregoing method design. The function may be implemented by using hardware, or may be implemented by executing corresponding software by using hardware. The hardware or the software includes one or more modules corresponding to the foregoing function. In a specific embodiment, the network device 210 may include a sending module 221, a receiving module 223, and a processing module 225. The sending module 221 may be a software module, or may be a hardware module such as a transmitter. The receiving module 223 may be a software module, or may be a hardware module such as a receiver. The sending module 221 and the receiving module 223 may be separately disposed, or may be disposed in an integrated manner, for example, are a transceiver. The processing module 225 may be a software module, or may be a hardware module such as a processor. The processor may be a central processing unit, a digital processor, a baseband processing chip, an ARM, or the like. This is not specifically limited herein.

The processing module 225 is configured to generate first downlink control information DCI, where the first DCI is used to indicate the terminal device to receive a first transport block on a first time-frequency resource, there is a mapping relationship between the first transport block and a first codeword, the first mapping relationship is determined based on first information, and the first information includes at least one of the following: first search space in which the first DCI is located, a first DCI format corresponding to the first DCI, a first radio network identifier RNTI used for scrambling the first DCI, or a first bit field included in the first DCI.

The processing module 225 is configured to send, to the terminal device, the first DCI generated by the processing module.

For example, the first bit field included in the first DCI is at least one of the following: a first modulation and coding scheme MCS bit field, a first redundancy version RV bit field, a first count downlink assignment index C-DAI, a first total downlink assignment index T-DAI, and an indication field of a correspondence between the first transport block and the codeword.

For example, the first bit field included in the first DCI is a first modulation and coding scheme MCS bit field and/or a first redundancy version RV bit field, an MCS index indicated by the first MCS bit field is a first MCS index, and an RV indicated by the first RV bit field is a first RV value.

For example, the sending module 221 is further configured to send second DCI to the terminal device, where the second DCI is used to indicate the terminal device to receive a second transport block on a second time-frequency resource, there is a second mapping relationship between the second transport block and a second codeword, the second mapping relationship is determined based on second information, and the second information includes at least one of the following: a second search space set in which the second DCI is located, a second DCI format corresponding to the second DCI, a second RNTI used for scrambling the second DCI, a second bit field included in the second DCI, the first codeword, or the first mapping relationship.

For example, the processing module 225 is further configured to: when the first bit field included in the first DCI is a first C-DAI bit field and a second C-DAI bit field, determine the first mapping relationship based on the first C-DAI bit field and the second C-DAI bit field; or when the first bit field included in the first DCI is a first T-DAI bit field and a second T-DAI bit field, determine the first mapping relationship based on the first T-DAI bit field and the second T-DAI bit field; or when the first bit field included in the first DCI is a first T-DAI bit field and a second T-DAI bit field and a first C-DAI bit field and a second C-DAI bit field, determine the first mapping relationship based on the first C-DAI bit field and the first T-DAI bit field and the second C-DAI bit field and the second T-DAI bit field.

For example, the apparatus further includes the receiving module 223, configured to receive first notification information, and the first notification information is used to notify the network device that the terminal device has a capability of simultaneously receiving two transport blocks whose time-frequency resources entirely or partially overlap.

For example, the sending module 221 is further configured to send first configuration information, and the first configuration information is used for performing configuration to indicate that the terminal device can simultaneously receive two transport blocks whose time-frequency resources entirely or partially overlap.

For example, the first search space set in which the first DCI is located and the second search space set in which the second DCI is located are respectively a common search space set and a UE-specific search space set; or the first DCI format corresponding to the first DCI and the second DCI format corresponding to the second DCI are respectively a DCI format 1_0 and a DCI format 1_1; or the first RNTI used for scrambling the first DCI and the second RNTI used for scrambling the second DCI are respectively a cell radio network temporary identifier C-RNTI and a modulation and coding scheme-cell radio network temporary identifier MCS-C-RNTI.

For example, a PDCCH monitoring occasion on which a first physical downlink control channel PDCCH that carries the first DCI is located is the same as a PDCCH monitoring occasion on which a second PDCCH that carries the second DCI is located; or an aggregation level of a first PDCCH that carries the first DCI is the same as an aggregation level of a second PDCCH that carries the second DCI; or antenna port information indicated by the first DCI is different from antenna port information indicated by the second DCI.

For example, a time-frequency resource on which the first transport block is located and a time-frequency resource on which the second transport block is located entirely or partially overlap; or an antenna port corresponding to a demodulation reference signal of the first transport block is different from an antenna port corresponding to a demodulation reference signal of the second transport block; or HARQ information corresponding to the first transport block and HARQ information corresponding to the second transport block are carried on a same uplink channel.

It should be specially noted that, in the foregoing apparatus embodiment, an entity device corresponding to the processing module is a processor, an entity device corresponding to the receiving module is a receiver, and an entity device corresponding to the sending module is a transmitter.

The network device may perform steps performed by the network device in the method for determining a correspondence between a transport block and a codeword shown in FIG. 4 and FIG. 8. Details are not described herein again. For the details, refer to FIG. 4, FIG. 8, and related content.

This application further provides a communications system, including a terminal device and a network device, and the terminal device and the network device can communicate with each other in a wireless manner.

Figure 10:
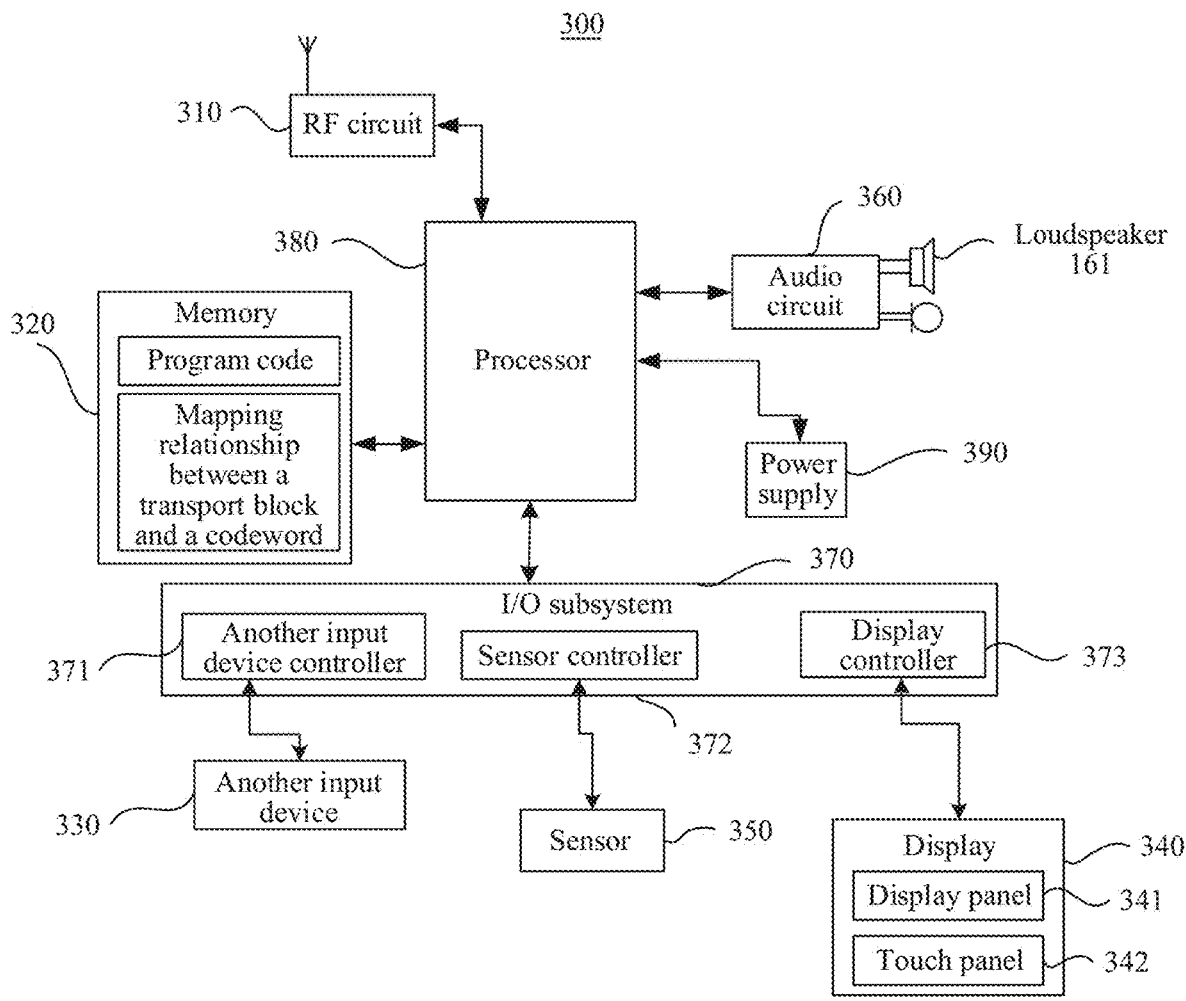
FIG. 10 is a schematic structural diagram of a terminal device according to an embodiment of this application.

FIG. 10 is a schematic structural diagram of a terminal device according to an embodiment of this application. The terminal device in this implementation includes a mobile phone, a tablet computer, a PDA (personal digital assistant), a POS (point of sales), an in-vehicle computer, and the like.

A mobile phone is used as an example of a terminal. FIG. 10 is a block diagram of a partial structure of a mobile phone 300 related to an embodiment of the present invention. As shown in FIG. 10, the mobile phone 300 includes components such as an RF (radio frequency) circuit 310, a memory 320, another input device 330, a display 340, a sensor 350, an audio circuit 360, an I/O subsystem 370, a processor 380, and a power supply 390. A person skilled in the art may understand that a structure of the mobile phone shown in FIG. 10 does not constitute a limitation on the mobile phone, and the mobile phone may include more or fewer components than those shown in the figure, or combine some components, or have different component arrangements. A person skilled in the art may understand that the display 340 belongs to a user interface (UI), and the mobile phone 300 may include a user interface shown in the figure or a user interface that includes fewer components than those shown in the figure.

Components of the mobile phone 300 are specifically described below with reference to FIG. 10.

The RF circuit 110 may be configured to: receive and send information or receive and send a signal in a call process, and in particular, receive downlink information of a base station and send the downlink information to the processor 380 for processing; and in addition, send uplink data to the base station. Generally, the RF circuit includes but is not limited to an antenna, at least one amplifier, a transceiver, a coupler, an LNA (low noise amplifier), a duplexer, and the like. In addition, the RF circuit 110 may further communicate with a network and another device through wireless communication. The wireless communication may use any communications standard or protocol, including but not limited to GSM (global system for mobile communications), GPRS (general packet radio service), CDMA (code division multiple access), WCDMA (wideband code division multiple access), LTE (long term evolution), e-mail, SMS (short messaging service), and the like. In this embodiment of this application, the RF circuit 110 may be configured to receive first DCI, second DCI, and first configuration information. In addition, the RF circuit 110 may be further configured to send first notification information.

The memory 320 may be configured to store a software program and a module. The processor 380 executes various functional applications and data processing of the mobile phone 300 by running the software program and the module that are stored in the memory 320. The memory 320 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone 300. In addition, the memory 320 may include a high-speed random access memory, and may further include a non-volatile memory such as at least one magnetic disk storage component, a flash memory component, or another volatile solid-state storage component. In a specific embodiment of this application, the memory 320 may store a correspondence between a transport block and a codeword.

The another input device 330 may be configured to receive input digit or character information and generate key signal input related to user setting and function control of the mobile phone 300. Specifically, the another input device 330 may include but is not limited to one or more of a physical keyboard, a function key (such as a volume control key or an on/off key), a trackball, a mouse, a joystick, an optical mouse (the optical mouse is a touch-sensitive surface that does not display visual output, or an extension of a touch-sensitive surface including a touchscreen), and the like. The another input device 330 is connected to another input device controller 371 of the I/O subsystem 370, and performs signal interaction with the processor 380 under control of the another device input controller 371.

The display 340 may be configured to display information entered by a user or information provided for a user, and various menus of the mobile phone 300, and may further receive user input. Specifically, the display 340 may include a display panel 341 and a touch panel 342. The display panel 341 may be configured in a form of an LCD (liquid crystal display), an OLED (organic light-emitting diode), or the like. The touch panel 342, also referred to as a touch-sensitive screen, or the like, may collect a contact or non-contact operation of the user on or near the touch panel 342 (for example, an operation performed by the user on the touch panel 342 or near the touch panel 342 by using any suitable object or accessory such as a finger or a stylus), or may include a somatosensory operation, and this operation may include an operation type such as a single-point control operation or a multi-point control operation, and drive a corresponding connected apparatus based on a preset program. Optionally, the touch panel 342 may include two parts: a touch detection apparatus and a touch controller. The touch detection apparatus detects a touch position and posture of the user, detects a signal brought by the touch operation, and transmits the signal to the touch controller. The touch controller receives touch information from the touch detection apparatus, converts the touch information into information that can be processed by the processor, sends the information to the processor 380, and can receive and execute a command sent by the processor 380. In addition, the touch panel 342 may be implemented by using a plurality of types such as a resistive type, a capacitive type, an infrared type, and a surface acoustic wave, or the touch panel 342 may be implemented by using any technology developed in the future. Further, the touch panel 342 may cover the display panel 341, and the user may perform, based on content displayed on the display panel 341 (the displayed content includes but is not limited to a soft keyboard, a virtual mouse, a virtual key, an icon, and the like), an operation on or near the touch panel 342 covered on the display panel 341. After detecting the operation on or near the touch panel 342, the touch panel 342 transmits the operation to the processor 380 by using the I/O subsystem 370 to determine the user input, and then the processor 380 provides corresponding visual output on the display panel 341 by using the I/O subsystem 370 based on the user input. In FIG. 10, the touch panel 342 and the display panel 341 are used as two independent components to implement input and output functions of the mobile phone 300. However, in some embodiments, the touch panel 342 and the display panel 341 may be integrated to implement the input and output functions of the mobile phone 300.

The mobile phone 300 may further include at least one sensor 350, such as an optional sensor, a motion sensor, and another sensor. Specifically, the optional sensor may include an ambient light sensor and a proximity sensor. The ambient light sensor may adjust luminance of the display panel 341 based on brightness of ambient light, and the proximity sensor may disable the display panel 341 and/or backlight when the mobile phone 300 approaches an ear. As a type of the motion sensor, an accelerometer sensor may detect magnitude of an acceleration in each direction (generally three axes), and may detect magnitude and a direction of gravity when being static. The accelerometer sensor may be used in an application (for example, horizontal and vertical screen switching, a related game, or magnetometer posture calibration) used for recognizing a gesture of the mobile phone, a function related to vibration recognition (for example, a pedometer or a strike), or the like. For other sensors such as a gyroscope, a barometer, a hygrometer, a thermometer, and an infrared sensor that may be further configured for the mobile phone 300, details are not described herein.

The audio circuit 360, a loudspeaker 361, and a microphone 362 may provide an audio interface between the user and the mobile phone 300. The audio circuit 360 may transmit, to the loudspeaker 361, a signal obtained after converting received audio data, and the loudspeaker 361 converts the signal into a sound signal and output the sound signal. In another aspect, the microphone 362 converts the collected sound signal into a signal, and the audio circuit 360 receives the signal and converts the signal into audio data, and then outputs the audio data to the RF circuit 308, to send the audio data to, for example, another mobile phone, or to output the audio data to the memory 320 for further processing.

The I/O subsystem 370 is configured to control an external device used for input and output, and may include the another device input controller 371, a sensor controller 372, and a display controller 373. Optionally, one or more other input control device controllers 371 receive a signal from the another input device 330 and/or send a signal to the another input device 330, the another input device 330 may include a physical button (a press button, a rocker button, or the like), a dial pad, a sliding switch, a joystick, a tap roller, and an optical mouse (the optical mouse is a touch-sensitive surface that does not display visual output, or is an extension of a touch-sensitive surface including a touchscreen). It should be noted that, the another input control device controller 371 may be connected to any one or more of the foregoing devices. The display controller 373 in the I/O subsystem 370 receives a signal from the display 340 and/or sends a signal to the display 340. After the display 340 detects the user input, the display controller 373 converts the detected user input into interaction with a user interface object displayed on the display 340, in other words, human-computer interaction is implemented. The sensor controller 372 may receive a signal from one or more sensors 350 and/or send a signal to one or more sensors 350.

The processor 380 is a control center of the mobile phone 300, and is connected to all parts of the entire mobile phone by using various interfaces and lines, and performs various functions of the mobile phone 300 and processes data by running or executing the software program and/or the module that are stored in the memory 320 and invoking the data stored in the memory 320, to implement overall monitoring on the mobile phone. Optionally, the processor 380 may include one or more processing units. Preferably, the processor 380 may be integrated with an application processor and a modem processor. The application processor mainly processes an operating system, a user interface, an application program, and the like, and the modem processor mainly processes wireless communication. It may be understood that the modem processor may alternatively not be integrated into the processor 380. In a specific embodiment of this application, the processor 300 may be configured to determine, based on first information of first DCI and/or based on second DCI, that a first transport block is mapped to a first codeword, and that a second transport block is mapped to a second codeword.

The mobile phone 300 may further include the power supply 390 (such as a battery) that supplies power to each component. Preferably, the power supply may be logically connected to the processor 180 by using a power management system, to implement functions such as charging, discharging, and power consumption by using the power management system.

Although not shown, the mobile phone 300 may further include a camera, a Bluetooth module, and the like. Details are not described herein.

The terminal device may perform steps performed by the terminal device in the method for determining a correspondence between a transport block and a codeword shown in FIG. 4 and FIG. 8. Details are not described herein again. For the details, refer to FIG. 4, FIG. 8, and related content.

Figure 11:
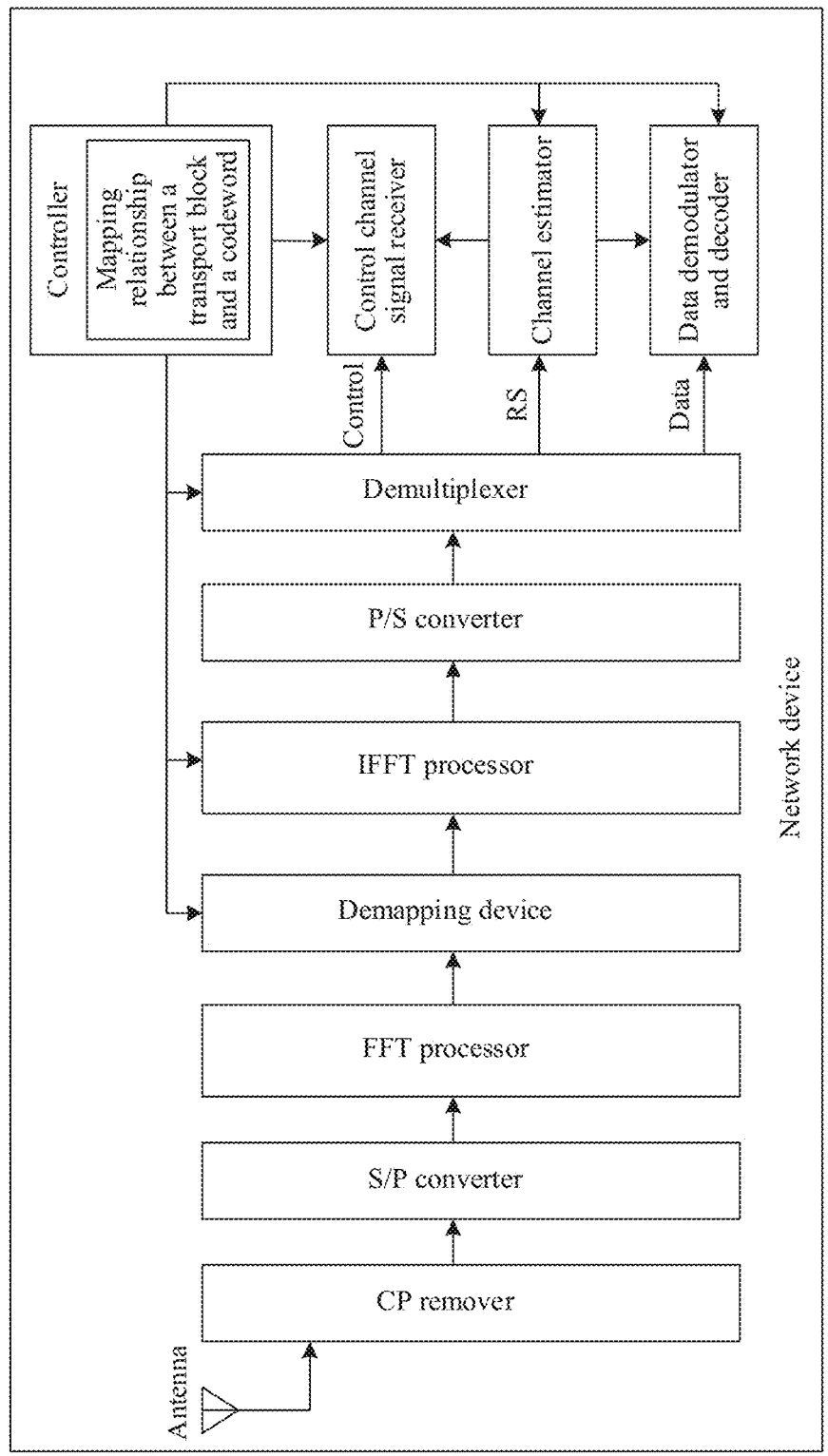
FIG. 11 is a schematic structural diagram of a network device according to an embodiment of this application.

FIG. 11 is a schematic structural diagram of a network device according to an embodiment of this application. The network device in this implementation may be described by using a base station as an example. The base station includes an antenna, a cyclic prefix (CP) remover, a serial-to-parallel (S/P) converter, a fast Fourier transform (FFT) processor, a demapping device, an inverse fast Fourier transform (IFFT) processor, and a parallel-to-serial (P/S) converter, a demultiplexer (DEMUX), a controller, a control channel signal receiver, a channel estimator, and a data demodulator and decoder.

The antenna may be an array antenna. The array antenna may use a single-input single-output manner, a single-input multiple-output manner, a multiple-input single-output manner, or a multiple-input multiple-output manner. In this embodiment of this application, the antenna may be configured to send first DCI or second DCI, the antenna may be further configured to send first configuration information, and in addition, the antenna may be further configured to receive first notification information sent by a terminal device.

The controller provides overall control. The controller also generates control signals required by the DEMUX, the IFFT processor, the demapping device, the control channel signal receiver, the channel estimator, and the data demodulator and decoder. A control signal related to UL control information and data is provided to the control channel signal receiver and a data demodulator and decoder 2. A control channel signal indicating a sequence index and a time domain cyclic shift value is provided to the channel estimator. The sequence index and the time domain cyclic shift value are used to generate a pilot sequence to be allocated to UE. In a specific embodiment of this application, the controller may store a correspondence between a transport block and a codeword.

The DEMUX demultiplexes a signal received from the P/S converter into a control channel signal, a data signal, and a pilot signal based on timing information received from the controller. The demapping device extracts those signals from a frequency resource based on the timing information and frequency allocation information that are received from the controller.

When a signal including control information is received from the UE via the antenna, the CP remover removes CP from the received signal. A CP-free signal is converted into a parallel signal through S/P conversion, and the FFT processor processes the parallel signal through FFT. After being demapped in the demapping device, an FFT signal is converted into a time signal in the IFFT processor. An input/output size of the IFFT processor varies with a control signal received from the controller. The P/S converter serializes the IFFT signal, and the DEMUX demultiplexes a serial signal into a control channel signal, a pilot signal, and a data signal.

The channel estimator obtains channel estimation from the pilot signal received by the DEMUX. The control channel signal receiver performs, through channel estimation, channel compensation for the control channel signal received from the DEMUX, and obtains control information sent by the UE. The data demodulator and decoder performs, through channel estimation, channel compensation on the data signal received from the DEMUX, and then obtains, based on the control information, data sent by the UE.

The network device may perform steps performed by the network device in the method for determining a correspondence between a transport block and a codeword shown in FIG. 4 and FIG. 8. Details are not described herein again. For the details, refer to FIG. 4, FIG. 8, and related content.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a storage disk, or a magnetic tape), an optical medium (for example, a DVD), or a semiconductor medium (for example, a solid-state storage disk (Solid State Disk, SSD)).

What is claimed is:

1. A method comprising:
receiving, by a terminal device, first downlink control information (DCI), wherein the first DCI indicates to the terminal device to receive a first transport block on a first time-frequency resource;
receiving, by the terminal device, second DCI, wherein the second DCI indicates to the terminal device to receive a second transport block on a second time-frequency resource;
determining, by the terminal device based on first information, that the first transport block is mapped to a first codeword, wherein the first information comprises at least one of: a first search space set in which the first DCI is located, a first DCI format corresponding to the first DCI, a first radio network identifier (RNTI) used for scrambling the first DCI, or a first bit field comprised in the first DCI; and
determining, by the terminal device based on second information, that the second transport block is mapped to a second codeword, wherein the second information comprises at least one of the following: a second search space set in which the second DCI is located, a second DCI format corresponding to the second DCI, a second RNTI used for scrambling the second DCI, a second bit field comprised in the second DCI, or the first codeword.

2. The method according to claim 1, wherein the first bit field comprised in the first DCI comprises at least one of the following: a first modulation and coding scheme (MCS) bit field, a first redundancy version (RV) bit field, a first count downlink assignment index (C-DAI), a first total downlink assignment index (T-DAI), and an indication field of a correspondence between the first transport block and the first codeword.

3. The method according to claim 2, wherein the first bit field comprised in the first DCI comprises the first MCS bit field or the first RV bit field, and determining, based on the first information, that the first transport block is mapped to the first codeword comprises:
determining, by the terminal device based on that an MCS index indicated by the first MCS bit field is a first MCS index indicating the first codeword or based on that an RV indicated by the first RV bit field is a first RV value indicating the first codeword, that the first transport block is mapped to the first codeword.

4. The method according to claim 1, wherein the first information comprises the first bit field comprised in the first DCI, and the first bit field comprises a first count downlink assignment index (C-DAI) or a first total downlink assignment index (T-DAI).

5. A method comprising:
generating, by a network device, first downlink control information (DCI), wherein the first DCI indicates to a terminal device to receive a first transport block on a first time-frequency resource, the first transport block is mapped to a first codeword according to a first mapping relationship that is determined based on first information, and the first information comprises at least one of the following: a first search space set in which the first DCI is located, a first DCI format corresponding to the first DCI, a first radio network identifier (RNTI) used for scrambling the first DCI, or a first bit field comprised in the first DCI;
sending, by the network device, the first DCI to the terminal device; and
sending, by the network device, second DCI to the terminal device, wherein the second DCI indicates to the terminal device to receive a second transport block on a second time-frequency resource, and the second transport block is mapped to a second codeword according to a second mapping relationship that is determined based on second information.

6. The method according to claim 5, wherein the first bit field comprised in the first DCI comprises at least one of following: a first modulation and coding scheme (MCS) bit field, a first redundancy version (RV) bit field, a first count downlink assignment index (C-DAI), a first total downlink assignment index (T-DAI), and an indication field of a correspondence between the first transport block and the first codeword.

7. The method according to claim 6, wherein the first bit field comprised in the first DCI comprises the first MCS bit field or the first RV bit field, an MCS index indicated by the first MCS bit field is a first MCS index indicating the first codeword, and an RV indicated by the first RV bit field is a first RV value indicating the first codeword.

8. The method according to claim 6, wherein the second information comprises at least one of the following: a second search space set in which the second DCI is located, a second DCI format corresponding to the second DCI, a second RNTI used for scrambling the second DCI, a second bit field comprised in the second DCI, the first codeword, or the first mapping relationship.

9. The method according to claim 5, wherein the first information comprises the first bit field comprised in the first DCI, and the first bit field comprises a first count downlink assignment index (C-DAI) or a first total downlink assignment index (T-DAI).

10. The method according to claim 5, further comprising:
sending, by the network device, first configuration information, wherein the first configuration information configures the terminal device to simultaneously receive two transport blocks whose time-frequency resources entirely or partially overlap.

11. An apparatus comprising:
a receiver, configured to:
  receive first downlink control information (DCI), wherein the first DCI indicates a terminal device to receive a first transport block on a first time-frequency resource; and
  receive second DCI, wherein the second DCI indicates the terminal device to receive a second transport block on a second time-frequency resource; and
a processor, configured to:
  determine, based on first information, that the first transport block indicated by the first DCI received by the receiver is mapped to a first codeword, wherein the first information comprises at least one of the following: a first search space set in which the first DCI is located, a first DCI format corresponding to the first DCI, a first radio network identifier (RNTI) used for scrambling the first DCI, or a first bit field comprised in the first DCI; and
  determine, based on second information, that the second transport block indicated by the second DCI received by the receiver is mapped to a second codeword, wherein the second codeword is different from the first codeword, and wherein the second information comprises at least one of the following: a second search space set in which the second DCI is located, a second DCI format corresponding to the second DCI, a second RNTI used for scrambling the second DCI, a second bit field comprised in the second DCI, or the first codeword.

12. The apparatus according to claim 11, wherein the first bit field comprised in the first DCI comprises at least one of the following: a first modulation and coding scheme (MCS) bit field, a first redundancy version (RV) bit field, a first count downlink assignment index (C-DAI), a first total downlink assignment index (T-DAI), and an indication field of a correspondence between the first transport block and the first codeword.

13. The apparatus according to claim 12, wherein
the processor is further configured to: when the first bit field comprised in the first DCI comprises the first MCS bit field or the first RV bit field, determine, based on that an MCS index indicated by the first MCS bit field is a first MCS index indicating the first codeword or an RV indicated by the first RV bit field is a first RV value indicating the first codeword, that the first transport block is mapped to the first codeword.

14. The apparatus according to claim 11, wherein the first information comprises the first bit field comprised in the first DCI, and the first bit field comprises a first count downlink assignment index (C-DAI) or a first total downlink assignment index (T-DAI).

15. The apparatus according to claim 11, wherein the processor is further configured to:
when the first bit field comprised in the first DCI comprises a first T-DAI bit field and a second T-DAI bit field, determine, based on values of the first T-DAI bit field and the second T-DAI bit field, that the first transport block is mapped to the first codeword; or
when the first bit field comprised in the first DCI comprises a first C-DAI bit field and a second C-DAI bit field, determine, based on values of the first C-DAI bit field and the second C-DAI bit field, that the first transport block is mapped to the first codeword; or
when the first bit field comprised in the first DCI comprises a first T-DAI bit field and a second T-DAI bit field and a first C-DAI bit field and a second C-DAI bit field, determine, based on values of the first C-DAI bit field and the second C-DAI bit field and values of the first T-DAI bit field and the second T-DAI bit field, that the first transport block is mapped to the first codeword.

16. An apparatus comprising:
a processor, configured to:
  generate first downlink control information (DCI), wherein the first DCI indicates a terminal device to receive a first transport block on a first time-frequency resource, the first transport block is mapped to a first codeword according to a first mapping relationship that is determined based on first information, and the first information comprises at least one of the following: a first search space set in which the first DCI is located, a first DCI format corresponding to the first DCI, a first radio network identifier (RNTI) used for scrambling the first DCI, or a first bit field comprised in the first DCI; and
  generate second DCI, wherein the second DCI indicates the terminal device to receive a second transport block on a second time-frequency resource, the second transport block is mapped to a second codeword according to a second mapping relationship that is determined based on second information; and
a transmitter, configured to send, to the terminal device, the first DCI and the second DCI.

17. The apparatus according to claim 16, wherein the first bit field comprised in the first DCI comprises at least one of the following: a first modulation and coding scheme (MCS) bit field, a first redundancy version (RV) bit field, a first count downlink assignment index (C-DAI), a first total downlink assignment index T-DAI, and an indication field of a correspondence between the first transport block and the first codeword.

18. The apparatus according to claim 17, wherein the first bit field comprised in the first DCI comprises the first MCS bit field or the first redundancy version (RV) bit field, an MCS index indicated by the first MCS bit field is a first MCS index indicating the first codeword, and an RV indicated by the first RV bit field is a first RV value indicating the first codeword.

19. The apparatus according to claim 16, wherein
the second information comprises at least one of: a second search space set in which the second DCI is located, a second DCI format corresponding to the second DCI, a second RNTI used for scrambling the second DCI, a second bit field comprised in the second DCI, the first codeword, or the first mapping relationship.

20. The apparatus according to claim 19, wherein
the transmitter is further configured to send first configuration information, and the first configuration information configuring the terminal device to simultaneously receive two transport blocks whose time-frequency resources entirely or partially overlap.

* * * * *